(12) United States Patent
Blake et al.

(10) Patent No.: US 11,618,565 B2
(45) Date of Patent: *Apr. 4, 2023

(54) METHODS AND SYSTEMS FOR SELF-DEPLOYMENT OF OPERATIONAL INFRASTRUCTURE BY AN UNMANNED AERIAL VEHICLE (UAV)

(71) Applicant: Wing Aviation LLC, Mountain View, CA (US)

(72) Inventors: Jesse Blake, Sunnyvale, CA (US); James Schmalzried, San Jose, CA (US); Siegfried Zerweckh, Berkeley, CA (US); Andre Prager, Sunnyvale, CA (US); Scott Velez, Mountain View, CA (US)

(73) Assignee: Wing Aviation LLC, Mountain View, CA (US)

( * ) Notice: Subject to any disclaimer, the term of this patent is extended or adjusted under 35 U.S.C. 154(b) by 269 days.

This patent is subject to a terminal disclaimer.

(21) Appl. No.: 17/120,804

(22) Filed: Dec. 14, 2020

(65) Prior Publication Data
US 2021/0188434 A1    Jun. 24, 2021

Related U.S. Application Data

(63) Continuation of application No. 15/848,402, filed on Dec. 20, 2017, now Pat. No. 10,894,601.

(51) Int. Cl.
*B64C 39/00* (2006.01)
*B64C 39/02* (2023.01)
(Continued)

(52) U.S. Cl.
CPC .......... *B64C 39/024* (2013.01); *B64F 1/364* (2013.01); *G05D 1/104* (2013.01); *H02J 7/00* (2013.01);
(Continued)

(58) Field of Classification Search
USPC ....................................... 701/3–18
See application file for complete search history.

(56) References Cited

U.S. PATENT DOCUMENTS

| | | | |
|---|---|---|---|
| 3,917,196 A | 11/1975 | Pond et al. |
| 4,025,193 A | 5/1977 | Pond et al. |
| 6,144,899 A | 11/2000 | Babb et al. |
| 6,868,314 B1 | 3/2005 | Frink |
| 7,210,654 B1 | 5/2007 | Cox et al. |

(Continued)

FOREIGN PATENT DOCUMENTS

| CN | 20516889 U | 4/2016 |
|---|---|---|
| KR | 10-2017-0058519 | 5/2017 |

(Continued)

OTHER PUBLICATIONS

International Bureau, International Preliminary Report on Patentability dated Jul. 2, 2020, issued in connection with International Patent Application No. PCT/US2018/066220, filed on Dec. 18, 2018, 8 pages.

(Continued)

*Primary Examiner* — Jonathan L Sample
(74) *Attorney, Agent, or Firm* — McDonnell Boehnen Hulbert & Berghoff LLP

(57) ABSTRACT

Example implementations may relate to self-deployment of operational infrastructure by an unmanned aerial vehicle (UAV). Specifically, a control system may determine operational location(s) from which a group of UAVs is to provide aerial transport services in a geographic area. For at least a first of the operational location(s), the system may cause a first UAV from the group to perform an infrastructure deployment task that includes (i) a flight from a source location to the first operational location and (ii) installation of operational infrastructure at the first operational location by the first UAV. In turn, this may enable the first UAV to (Continued)

operate from the first operational location, as the first UAV can charge a battery of the first UAV using the operational infrastructure installed at the first operational location and/or can carry out item transport task(s) at location(s) that are in the vicinity of the first operational location.

20 Claims, 20 Drawing Sheets

(51) Int. Cl.
    *G05D 1/10* (2006.01)
    *B64F 1/36* (2017.01)
    *H02J 7/00* (2006.01)
    *H02J 7/35* (2006.01)

(52) U.S. Cl.
    CPC .......... *H02J 7/35* (2013.01); *B64C 2201/042* (2013.01); *B64C 2201/104* (2013.01); *B64C 2201/108* (2013.01); *B64C 2201/128* (2013.01)

(56) References Cited

U.S. PATENT DOCUMENTS

| | | | |
|---|---|---|---|
| 7,631,833 | B1 | 12/2009 | Ghaleb et al. |
| 7,637,196 | B2 | 12/2009 | Thornton |
| 8,104,718 | B2 | 1/2012 | Shaw |
| 8,909,391 | B1 | 12/2014 | Peeters et al. |
| 9,056,676 | B1 | 6/2015 | Wang |
| 9,174,733 | B1 | 11/2015 | Burgess et al. |
| 9,284,062 | B2 | 3/2016 | Wang |
| 9,305,280 | B1 | 4/2016 | Berg et al. |
| 9,346,560 | B2 | 5/2016 | Wang |
| 9,421,869 | B1 | 8/2016 | Ananthanarayanan et al. |
| 9,527,605 | B1 | 12/2016 | Gentry et al. |
| 9,534,906 | B2 | 1/2017 | High et al. |
| 9,536,516 | B2 | 1/2017 | Catchpole |
| 9,580,173 | B1 | 2/2017 | Burgess et al. |
| 9,586,683 | B1 | 3/2017 | Buchmueller et al. |
| 9,630,517 | B2 | 4/2017 | Lee et al. |
| 9,630,713 | B1 | 4/2017 | Von Novak, III |
| 9,645,582 | B2 | 5/2017 | Shue |
| 9,646,283 | B2 | 5/2017 | Kantor et al. |
| 9,678,507 | B1 | 6/2017 | Douglas et al. |
| 9,741,255 | B1 | 8/2017 | Navot et al. |
| 9,747,808 | B2 | 8/2017 | Chambers et al. |
| 9,778,653 | B1* | 10/2017 | McClintock ............ G06Q 10/08 |
| 9,801,517 | B2 | 10/2017 | High et al. |
| 9,868,526 | B2* | 1/2018 | Yates .................... B64C 39/024 |
| 9,908,638 | B1* | 3/2018 | Vawter ................. B64D 17/725 |
| 9,948,380 | B1 | 4/2018 | Vos et al. |
| 9,969,494 | B1* | 5/2018 | Buchmueller ......... G05D 1/0858 |
| 10,232,940 | B2 | 3/2019 | Shannon et al. |
| 10,266,266 | B2* | 4/2019 | Sopper .................. B64C 39/024 |
| 10,414,488 | B2 | 9/2019 | Prager et al. |
| 10,570,000 | B2 | 2/2020 | High et al. |
| 10,577,105 | B2 | 3/2020 | Prager |
| 10,580,311 | B2* | 3/2020 | Schmalzried .......... G06Q 10/04 |
| 10,604,252 | B2* | 3/2020 | Blake ...................... B64F 1/32 |
| 10,894,601 | B2* | 1/2021 | Blake ..................... B60L 53/53 |
| 11,119,494 | B2* | 9/2021 | Gu ................... G08G 1/096822 |
| 2003/0155463 | A1 | 8/2003 | Cox et al. |
| 2004/0068415 | A1 | 4/2004 | Solomon |
| 2004/0135931 | A1 | 7/2004 | Zhang et al. |
| 2006/0011777 | A1 | 1/2006 | Arlton et al. |
| 2006/0032984 | A1 | 2/2006 | Preston |
| 2008/0277524 | A1 | 11/2008 | Brock |
| 2009/0108135 | A1 | 4/2009 | Shaw |
| 2009/0112400 | A1 | 4/2009 | Urababa et al. |
| 2009/0157233 | A1 | 6/2009 | Kokkeby et al. |
| 2009/0205845 | A1 | 8/2009 | Hoffman |
| 2009/0224493 | A1 | 9/2009 | Buma et al. |
| 2009/0283626 | A1 | 11/2009 | Lutke et al. |
| 2009/0294573 | A1 | 12/2009 | Wilson et al. |
| 2009/0308979 | A1 | 12/2009 | Nadir |
| 2010/0004803 | A1 | 1/2010 | Manfredi et al. |
| 2010/0193625 | A1 | 8/2010 | Sommer |
| 2010/0198514 | A1 | 8/2010 | Miralles |
| 2010/0237183 | A1 | 9/2010 | Wilson et al. |
| 2011/0035149 | A1 | 2/2011 | McAndrew et al. |
| 2012/0145833 | A1 | 6/2012 | McCann et al. |
| 2013/0032034 | A1 | 2/2013 | Jarisch et al. |
| 2013/0048787 | A1 | 2/2013 | Riley et al. |
| 2014/0032034 | A1* | 1/2014 | Raptopoulos ...... H04B 7/18506 701/25 |
| 2014/0129059 | A1 | 5/2014 | Scarlatti et al. |
| 2014/0172194 | A1 | 6/2014 | Levien et al. |
| 2014/0222248 | A1 | 8/2014 | Levien et al. |
| 2014/0249692 | A1 | 9/2014 | Levien et al. |
| 2014/0277834 | A1 | 9/2014 | Levien et al. |
| 2015/0097530 | A1 | 4/2015 | Scarlatti et al. |
| 2015/0120094 | A1* | 4/2015 | Kimchi ................. B64C 39/024 701/3 |
| 2015/0142211 | A1 | 5/2015 | Shehata et al. |
| 2015/0276353 | A1 | 10/2015 | Ueno et al. |
| 2015/0336669 | A1 | 11/2015 | Kantor et al. |
| 2016/0031564 | A1 | 2/2016 | Yates |
| 2016/0039300 | A1 | 2/2016 | Wang et al. |
| 2016/0039542 | A1 | 2/2016 | Wang |
| 2016/0068267 | A1 | 3/2016 | Liu et al. |
| 2016/0068268 | A1 | 3/2016 | Bookless et al. |
| 2016/0107750 | A1* | 4/2016 | Yates .................... B64C 39/024 244/2 |
| 2016/0125746 | A1 | 5/2016 | Kunzi et al. |
| 2016/0144734 | A1* | 5/2016 | Wang .................... B64C 39/024 701/17 |
| 2016/0214715 | A1 | 7/2016 | Meffert |
| 2016/0229299 | A1 | 8/2016 | Streett |
| 2016/0244187 | A1 | 8/2016 | Byers et al. |
| 2016/0246304 | A1 | 8/2016 | Canoy et al. |
| 2016/0253908 | A1 | 9/2016 | Chambers et al. |
| 2016/0257401 | A1* | 9/2016 | Buchmueller ......... G01C 21/343 |
| 2016/0257423 | A1 | 9/2016 | Martin |
| 2016/0268823 | A1 | 9/2016 | Gonzalez et al. |
| 2016/0301859 | A1 | 10/2016 | Tebay |
| 2016/0304217 | A1 | 10/2016 | Fisher et al. |
| 2016/0306356 | A1 | 10/2016 | Tebay |
| 2016/0347462 | A1 | 12/2016 | Clark |
| 2016/0356574 | A1 | 12/2016 | Tebay |
| 2016/0368610 | A1 | 12/2016 | Erickson |
| 2016/0378108 | A1 | 12/2016 | Paczan et al. |
| 2016/0378121 | A1 | 12/2016 | Shue |
| 2017/0069214 | A1 | 3/2017 | Dupray et al. |
| 2017/0090271 | A1 | 3/2017 | Harris et al. |
| 2017/0117676 | A1 | 4/2017 | James et al. |
| 2017/0129603 | A1* | 5/2017 | Raptopoulos ........ G08G 5/0069 |
| 2017/0136887 | A1 | 5/2017 | Ricci |
| 2017/0139409 | A1 | 5/2017 | Clarke |
| 2017/0177006 | A1 | 6/2017 | Fisher et al. |
| 2017/0179768 | A1 | 6/2017 | Jurok |
| 2017/0217323 | A1 | 8/2017 | Antonini et al. |
| 2017/0227470 | A1 | 8/2017 | Cesarano |
| 2017/0270314 | A1* | 9/2017 | Tsybrovskyy ........ H04W 12/06 |
| 2017/0297445 | A1* | 10/2017 | Zheng ..................... B64D 5/00 |
| 2017/0343645 | A1* | 11/2017 | Kim ....................... B64C 39/024 |
| 2017/0349281 | A1* | 12/2017 | Quinlan ................. B64D 5/00 |
| 2018/0037322 | A1* | 2/2018 | Buchmueller ........ G06Q 50/28 |
| 2018/0217593 | A1* | 8/2018 | Erickson ............... G05D 1/104 |
| 2018/0312069 | A1 | 11/2018 | McClymond |
| 2019/0126769 | A1* | 5/2019 | Schmalzried .......... B60L 53/67 |
| 2019/0185157 | A1* | 6/2019 | Blake ..................... B60L 53/67 |
| 2019/0185158 | A1 | 6/2019 | Blake et al. |
| 2021/0300552 | A1* | 9/2021 | Isberg ..................... B64F 1/10 |

FOREIGN PATENT DOCUMENTS

| | | |
|---|---|---|
| WO | 89/09391 | 10/1989 |
| WO | 2016/059555 | 4/2016 |
| WO | 2016/145411 | 9/2016 |

(56) References Cited

FOREIGN PATENT DOCUMENTS

WO    2017/079623    5/2017
WO    2017/100579    6/2017

OTHER PUBLICATIONS

International Searching Authority, International Search Report and Written Opinion dated Apr. 30, 2019, issued in connection with International Patent Application No. PCT/US2018/066220, filed on Dec. 18, 2018, 11 pages.
International Searching Authority, International Search Report and Written Opinion dated Apr. 19, 2019, issued in connection with International Patent Application No. PCT/US2018/066392, filed on Dec. 19, 2018, 10 pages.
Intellectual Property Office of Singapore, Search Report dated Apr. 28, 2021, issued in connection with Singapore Patent Application No. 11202005614P, 3 pages.
European Patent Office, Extended European Search Report dated Jun. 14, 2021, issued in connection wtih European Patent Application No. 18892715.6, 7 pages.

* cited by examiner

OPERATIONAL LOCATION 704b

METHODS AND SYSTEMS FOR SELF-DEPLOYMENT OF OPERATIONAL INFRASTRUCTURE BY AN UNMANNED AERIAL VEHICLE (UAV)

CROSS-REFERENCE TO RELATED APPLICATION

This application is a continuation of and claims priority to U.S. patent application Ser. No. 15/848,402, filed Dec. 20, 2017, and entitled "Methods and Systems for Self-Deployment of Operational Infrastructure by an Unmanned Aerial Vehicle (UAV)," which is hereby incorporated by reference as if fully set forth in this description.

BACKGROUND

An unmanned system, which may also be referred to as an autonomous vehicle, is a vehicle capable of travel without a physically-present human operator. An unmanned system may operate in a remote-control mode, in an autonomous mode, or in a partially autonomous mode.

When an unmanned system operates in a remote-control mode, a pilot or driver that is at a remote location can control the unmanned vehicle via commands that are sent to the unmanned vehicle via a wireless link. When the unmanned system operates in autonomous mode, the unmanned system typically moves based on pre-programmed navigation waypoints, dynamic automation systems, or a combination of these. Further, some unmanned systems can operate in both a remote-control mode and an autonomous mode, and in some instances may do so simultaneously. For instance, a remote pilot or driver may wish to leave navigation to an autonomous system while manually performing another task, such as operating a mechanical system for picking up objects, as an example.

Various types of unmanned systems exist for various different environments. For instance, unmanned aerial vehicles (UAVs) are configured for operation in the air (e.g., flight). Examples include quad-copters and tail-sitter UAVs, among others. Unmanned systems also exist for hybrid operations in which multi-environment operation is possible. Examples of hybrid unmanned vehicles include an amphibious craft that is capable of operation on land as well as on water or a floatplane that is capable of landing on water as well as on land. Other examples are also possible.

SUMMARY

Example implementations may relate to arranging at least one UAV from a group of UAVs both to carry out item transport task(s) from an operational location and to deploy operational infrastructure (e.g., a charging system) at the operational location. Consequently, this UAV can use the operational infrastructure that the UAV deployed in order to charge the UAV's battery at the operational location from which the UAV is carrying out transport task(s).

More specifically, the group of UAVs may initially be in a source structure that has been temporarily or permanently placed in a geographic area at a select source location. The source structure can house one or more UAVs from the group, and perhaps also operational infrastructure that can be deployed throughout the geographic area, among other possibilities. In this way, the group can provide aerial transport services in the geographic area.

With this arrangement, a control system may determine operational locations from which the group is to provide aerial transport services in the geographic area. And for at least a first of these operational locations, the control system may cause a first UAV from the group to perform an infrastructure deployment task. This infrastructure deployment task may include a flight from the source structure to the first operational location as well as installation of operational infrastructure at the first operational location by the first UAV.

Once the infrastructure deployment task is complete, the first UAV can then operate from the first operational location at which the first UAV itself installed operational infrastructure. For example, the control system may determine that an item-source location (e.g., a pickup location) associated with a requested transport task corresponds to the first operational location, and may responsively cause the first UAV to perform the requested transport task. Moreover, the first UAV can charge its battery using the operational infrastructure that the first UAV installed at the first operational location. Other examples are also possible.

In one aspect, a method is disclosed. The method involves determining, by a control system, a plurality of operational locations from which a group of unmanned aerial vehicles (UAVs) is to provide aerial transport services in a geographic area, where the group of UAVs is initially located at a source location serving the geographic area. The method also involves, for at least a first of the plurality of operational locations, causing, by the control system, a first UAV from the group to perform an infrastructure deployment task that includes (i) a flight from the source location to the first of the plurality of operational locations and (ii) installation of operational infrastructure at the first of the plurality of operational locations by the first UAV. The method additionally involves receiving, by the control system, a request for a transport task having an associated item-source location. The method further involves determining, by the control system, that the item-source location corresponds to the first of the plurality of operational locations. The method yet further involves causing, by the control system, the first UAV to perform the transport task.

In another aspect, a UAV system is disclosed. The UAV system includes a group of UAVs, where the group of UAVs includes at least a first UAV. Also, the UAV system includes a control system configured to: (a) determine a plurality of operational locations from which the group of UAVs is to provide aerial transport services in a geographic area, wherein the group of UAVs is initially located at a source location serving the geographic area; (b) for at least a first of the plurality of operational locations, cause the first UAV to perform an infrastructure deployment task that includes (i) a flight from the source location to the first of the plurality of operational locations and (ii) installation of operational infrastructure at the first of the plurality of operational locations by the first UAV; (c) receive a request for a transport task having an associated item-source location; (d) determine that the item-source location corresponds to the first of the plurality of operational locations; and (e) cause the first UAV to perform the transport task.

In yet another aspect, a non-transitory computer readable medium is disclosed. The non-transitory computer readable medium has stored therein instructions executable by one or more processors to cause a control system to perform functions. The functions include determining a plurality of operational locations from which a group of unmanned aerial vehicles (UAVs) is to provide aerial transport services in a geographic area, where the group of UAVs is initially located at a source location serving the geographic area. The functions also include, for at least a first of the plurality of operational locations, causing a first UAV from the group to perform an infrastructure deployment task that includes (i) a flight from the source location to the first of the plurality of operational locations and (ii) installation of operational infrastructure at the first of the plurality of operational locations by the first UAV. The functions additionally include receiving a request for a transport task having an associated item-source location. The functions further include determining that the item-source location corresponds to the first of the plurality of operational locations. The functions yet further include causing the first UAV to perform the transport task.

In yet another aspect, another system is disclosed. The system may include means for determining a plurality of operational locations from which a group of unmanned aerial vehicles (UAVs) is to provide aerial transport services in a geographic area, where the group of UAVs is initially located at a source location serving the geographic area. The system may also include means for, for at least a first of the plurality of operational locations, causing a first UAV from the group to perform an infrastructure deployment task that includes (i) a flight from the source location to the first of the plurality of operational locations and (ii) installation of operational infrastructure at the first of the plurality of operational locations by the first UAV. The system may additionally include means for receiving a request for a transport task having an associated item-source location. The system may further include means for determining that the item-source location corresponds to the first of the plurality of operational locations. The system may yet further include means for causing the first UAV to perform the transport task.

These as well as other aspects, advantages, and alternatives, will become apparent to those of ordinary skill in the art by reading the following detailed description, with reference where appropriate to the accompanying drawings.

DETAILED DESCRIPTION

Figure 1A:
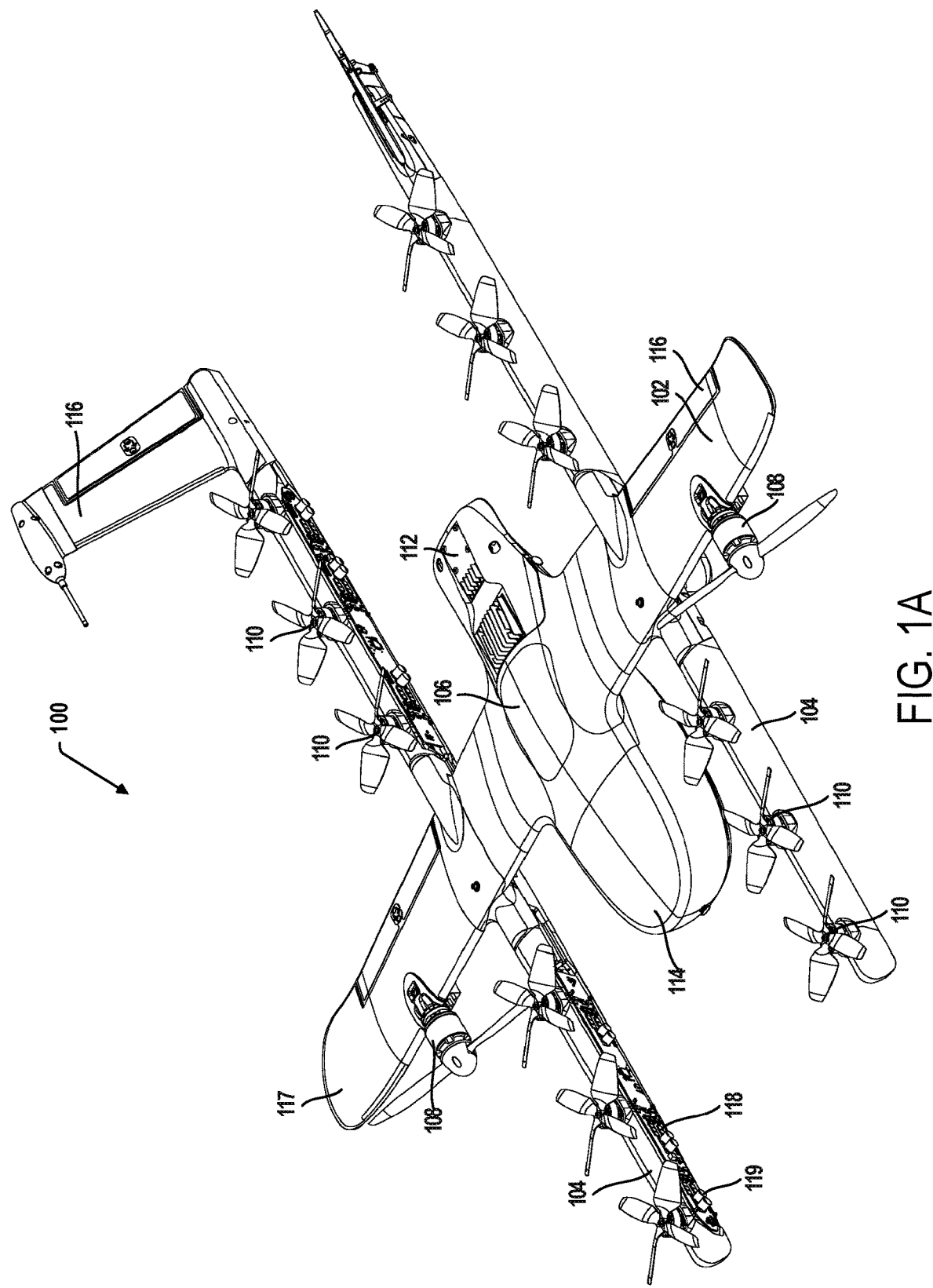
FIG. 1A is a simplified illustration of an unmanned aerial vehicle, according to example embodiments.

Example methods and systems are described herein. It should be understood that the words "example" and "example" are used herein to mean "serving as an example, instance, or illustration." Any embodiment or feature described herein as being an "example" or "example" is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

I. OVERVIEW

In practice, an unmanned aerial vehicle (UAV) may refer to any autonomous or semi-autonomous aerial vehicle that is capable of performing some operations without a physically present human pilot. Examples of such operations may include aerial transport services, which may involve a group of UAVs carrying out transport tasks, such as pickup and/or delivery of items.

Disclosed herein are implementations that relate to using a given UAV from a group of UAVs both for carrying out transport task(s) and for deployment of operational infrastructure. In practice, the operational infrastructure at issue can be one or more parts of a ground charging system that is configured to charge batteries of one or more UAVs, or can be the entire charging system. And a given operational location can be a location at which a UAV can charge after operational infrastructure has been deployed, and also one from which that same UAV can carry out a UAV transport task. As such, operational infrastructure can at least temporarily be installed by a UAV in the operational location from which it is carrying out transport task(s), so that this UAV does not necessarily have to rely on operational infrastructure installed at other location(s) for the purpose of charging its battery.

More specifically, the group of UAVs at issue may initially be in a source structure that has been temporarily or permanently placed in a geographic area at a select source location. For example, the source structure may be a container configured to house the group of UAVs and perhaps also operational infrastructure, among other options. And this container may be temporarily or permanently placed (e.g., after being transported by a truck) at a substantially central location in the geographic area, which may be considered as the source location at issue. In other examples, the source structure may be a distributor or retailer warehouse or a restaurant, among other possibilities. In any case, such an arrangement may allow the group to provide aerial transport service in the geographic area, such as by having one or more UAVs of the group pick up and/or deliver items in the geographic area.

According to the present disclosure, one or more UAVs of the group may each respectively include features that enable a given UAV to deploy operational infrastructure at operational location(s) within a geographic area. Additionally, these one or more UAVs may each respectively include features that enable a given UAV to carry out tasks other than deployment of operational infrastructure, such as transport tasks that include pickup and/or delivery of items other than operational infrastructure.

With this arrangement, a control system may determine operational locations from which the group is to provide aerial transport services in a geographic area, and can then cause one or more UAVs of the group to each respectively carry out an infrastructure deployment task for at least one of the determined operational locations. For instance, the control system may cause a first UAV from the group to perform an infrastructure deployment task that includes (i) a flight from the source structure to the first operational location and (ii) installation of operational infrastructure at the first operational location by the first UAV.

When a given UAV performs an infrastructure deployment task for an operational location, this may in turn enable that UAV to operate from that operational location.

Specifically, the UAV can carry out one or more transport tasks from the operational location for which an infrastructure deployment task was performed. By way of example, the control system may receive a request for a transport task having an associated item-source location (e.g., a pickup location), and the control system may determine that the item-source location corresponds to the first operational location. For instance, the control system can determine that the item-source location is in a sub area of the geographic area that is substantially in the vicinity of the first operational location. And when the control system determines that the item-source location corresponds to the first operational location, the control system may responsively cause the first UAV to perform the transport task corresponding to the received request.

Moreover, when a UAV performs an infrastructure deployment task for an operational location, this may enable the UAV to conveniently charge its battery at the same operational location from which it is carrying out transport task(s). For example, the first UAV can charge a battery of the first UAV using the operational infrastructure installed at the first operational location, and can do so at any feasible time. For instance, the first UAV can charge its battery at the operational location immediately upon completion of the infrastructure deployment task, while carrying out a transport task, and/or after carrying out one or more transport tasks, among other options. Other examples are also possible.

II. ILLUSTRATIVE UNMANNED VEHICLES

Herein, the terms "unmanned aerial system" and "UAV" refer to any autonomous or semi-autonomous vehicle that is capable of performing some functions without a physically present human pilot.

A UAV can take various forms. For example, a UAV may take the form of a fixed-wing aircraft, a glider aircraft, a tail-sitter aircraft, a jet aircraft, a ducted fan aircraft, a lighter-than-air dirigible such as a blimp or steerable balloon, a rotorcraft such as a helicopter or multicopter, and/or an ornithopter, among other possibilities. Further, the terms "drone," "unmanned aerial vehicle system" (UAVS), or "unmanned aerial vehicle" (UAV) may also be used to refer to a UAV.

FIG. 1A is an isometric view of an example UAV 100. UAV 100 includes wing 102, booms 104, and a fuselage 106. Wings 102 may be stationary and may generate lift based on the wing shape and the UAV's forward airspeed. For instance, the two wings 102 may have an airfoil-shaped cross section to produce an aerodynamic force on UAV 100. In some embodiments, wing 102 may carry horizontal propulsion units 108, and booms 104 may carry vertical propulsion units 110. In operation, power for the propulsion units may be provided from a battery compartment 112 of fuselage 106. In some embodiments, fuselage 106 also includes an avionics compartment 114, an additional battery compartment (not shown) and/or a delivery unit (not shown, e.g., a winch system) for handling the payload. In some embodiments, fuselage 106 is modular, and two or more compartments (e.g., battery compartment 112, avionics compartment 114, other payload and delivery compartments) are detachable from each other and securable to each other (e.g., mechanically, magnetically, or otherwise) to contiguously form at least a portion of fuselage 106.

In some embodiments, booms 104 terminate in rudders 116 for improved yaw control of UAV 100. Further, wings 102 may terminate in wing tips 117 for improved control of lift of the UAV.

In the illustrated configuration, UAV 100 includes a structural frame. The structural frame may be referred to as a "structural H-frame" or an "H-frame" (not shown) of the UAV. The H-frame may include, within wings 102, a wing spar (not shown) and, within booms 104, boom carriers (not shown). In some embodiments the wing spar and the boom carriers may be made of carbon fiber, hard plastic, aluminum, light metal alloys, or other materials. The wing spar and the boom carriers may be connected with clamps. The wing spar may include pre-drilled holes for horizontal propulsion units 108, and the boom carriers may include pre-drilled holes for vertical propulsion units 110.

In some embodiments, fuselage 106 may be removably attached to the H-frame (e.g., attached to the wing spar by clamps, configured with grooves, protrusions or other features to mate with corresponding H-frame features, etc.). In other embodiments, fuselage 106 similarly may be removably attached to wings 102. The removable attachment of fuselage 106 may improve quality and or modularity of UAV 100. For example, electrical/mechanical components and/or subsystems of fuselage 106 may be tested separately from, and before being attached to, the H-frame. Similarly, printed circuit boards (PCBs) 118 may be tested separately from, and before being attached to, the boom carriers, therefore eliminating defective parts/subassemblies prior to completing the UAV. For example, components of fuselage 106 (e.g., avionics, battery unit, delivery units, an additional battery compartment, etc.) may be electrically tested before fuselage 106 is mounted to the H-frame. Furthermore, the motors and the electronics of PCBs 118 may also be electrically tested before the final assembly. Generally, the identification of the defective parts and subassemblies early in the assembly process lowers the overall cost and lead time of the UAV. Furthermore, different types/models of fuselage 106 may be attached to the H-frame, therefore improving the modularity of the design. Such modularity allows these various parts of UAV 100 to be upgraded without a substantial overhaul to the manufacturing process.

In some embodiments, a wing shell and boom shells may be attached to the H-frame by adhesive elements (e.g., adhesive tape, double-sided adhesive tape, glue, etc.). Therefore, multiple shells may be attached to the H-frame instead of having a monolithic body sprayed onto the H-frame. In some embodiments, the presence of the multiple shells reduces the stresses induced by the coefficient of thermal expansion of the structural frame of the UAV. As a result, the UAV may have better dimensional accuracy and/or improved reliability.

Moreover, in at least some embodiments, the same H-frame may be used with the wing shell and/or boom shells having different size and/or design, therefore improving the modularity and versatility of the UAV designs. The wing shell and/or the boom shells may be made of relatively light polymers (e.g., closed cell foam) covered by the harder, but relatively thin, plastic skins.

The power and/or control signals from fuselage 106 may be routed to PCBs 118 through cables running through fuselage 106, wings 102, and booms 104. In the illustrated embodiment, UAV 100 has four PCBs, but other numbers of PCBs are also possible. For example, UAV 100 may include two PCBs, one per the boom. The PCBs carry electronic components 119 including, for example, power converters, controllers, memory, passive components, etc. In operation, propulsion units 108 and 110 of UAV 100 are electrically connected to the PCBs.

Many variations on the illustrated UAV are possible. For instance, fixed-wing UAVs may include more or fewer rotor units (vertical or horizontal), and/or may utilize a ducted fan or multiple ducted fans for propulsion. Further, UAVs with more wings (e.g., an "x-wing" configuration with four wings), are also possible. Although FIG. 1A illustrates two wings 102, two booms 104, two horizontal propulsion units 108, and six vertical propulsion units 110 per boom 104, it should be appreciated that other variants of UAV 100 may be implemented with more or less of these components. For example, UAV 100 may include four wings 102, four booms 104, and more or less propulsion units (horizontal or vertical).

Figure 1B:
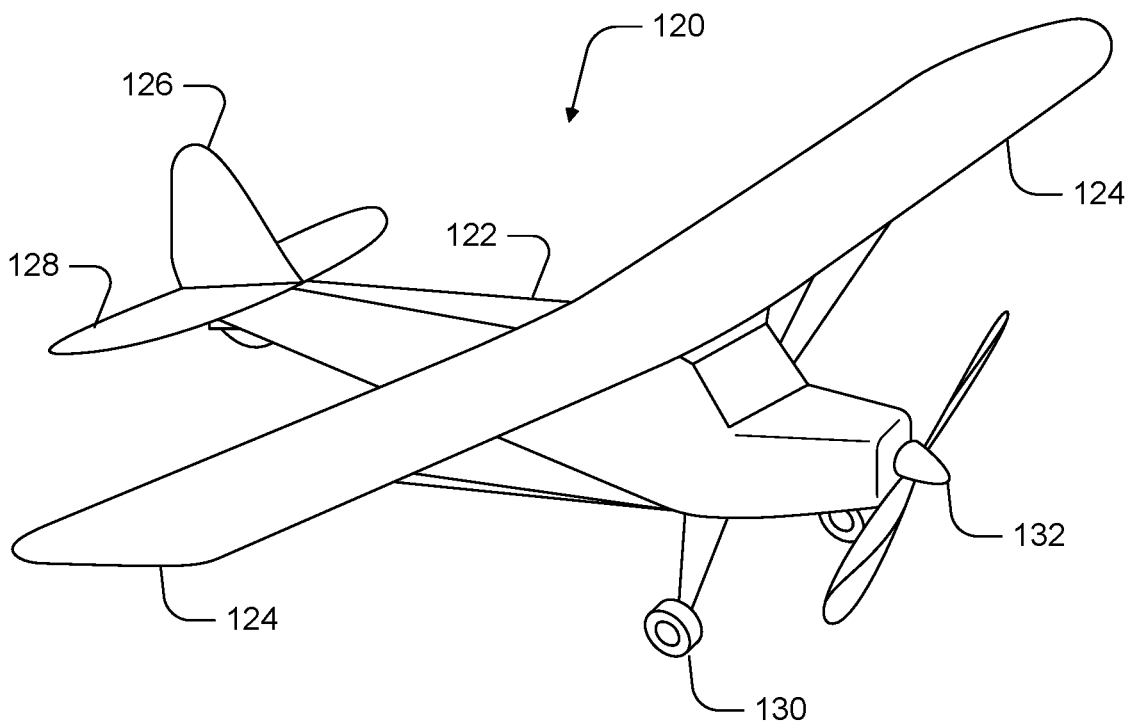
FIG. 1B is a simplified illustration of an unmanned aerial vehicle, according to example embodiments.

Similarly, FIG. 1B shows another example of a fixed-wing UAV 120. The fixed-wing UAV 120 includes a fuselage 122, two wings 124 with an airfoil-shaped cross section to provide lift for the UAV 120, a vertical stabilizer 126 (or fin) to stabilize the plane's yaw (turn left or right), a horizontal stabilizer 128 (also referred to as an elevator or tailplane) to stabilize pitch (tilt up or down), landing gear 130, and a propulsion unit 132, which can include a motor, shaft, and propeller.

Figure 1C:
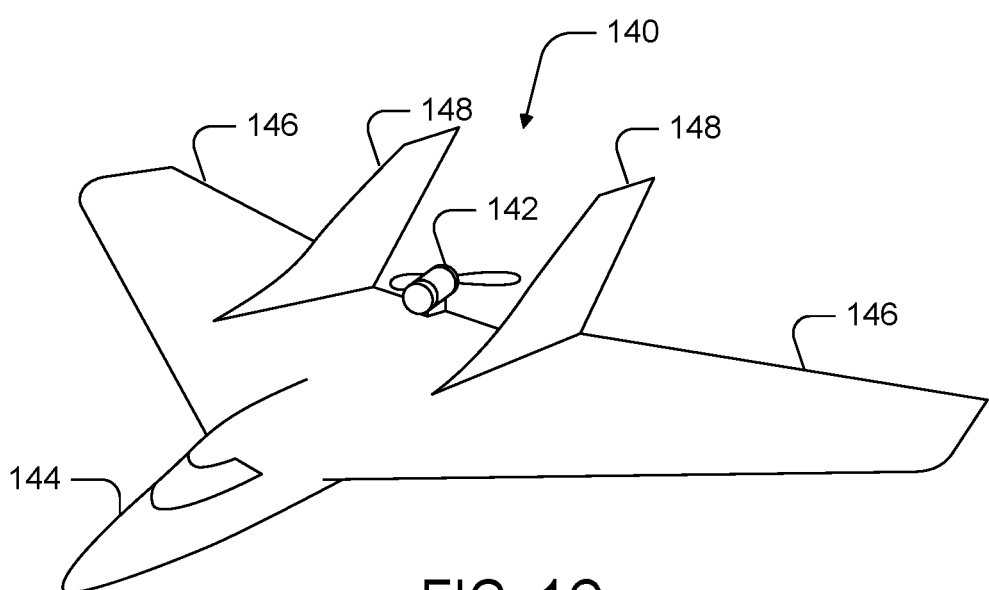
FIG. 1C is a simplified illustration of an unmanned aerial vehicle, according to example embodiments.

FIG. 1C shows an example of a UAV 140 with a propeller in a pusher configuration. The term "pusher" refers to the fact that a propulsion unit 142 is mounted at the back of the UAV and "pushes" the vehicle forward, in contrast to the propulsion unit being mounted at the front of the UAV. Similar to the description provided for FIGS. 1A and 1B, FIG. 1C depicts common structures used in a pusher plane, including a fuselage 144, two wings 146, vertical stabilizers 148, and the propulsion unit 142, which can include a motor, shaft, and propeller.

Figure 1D:
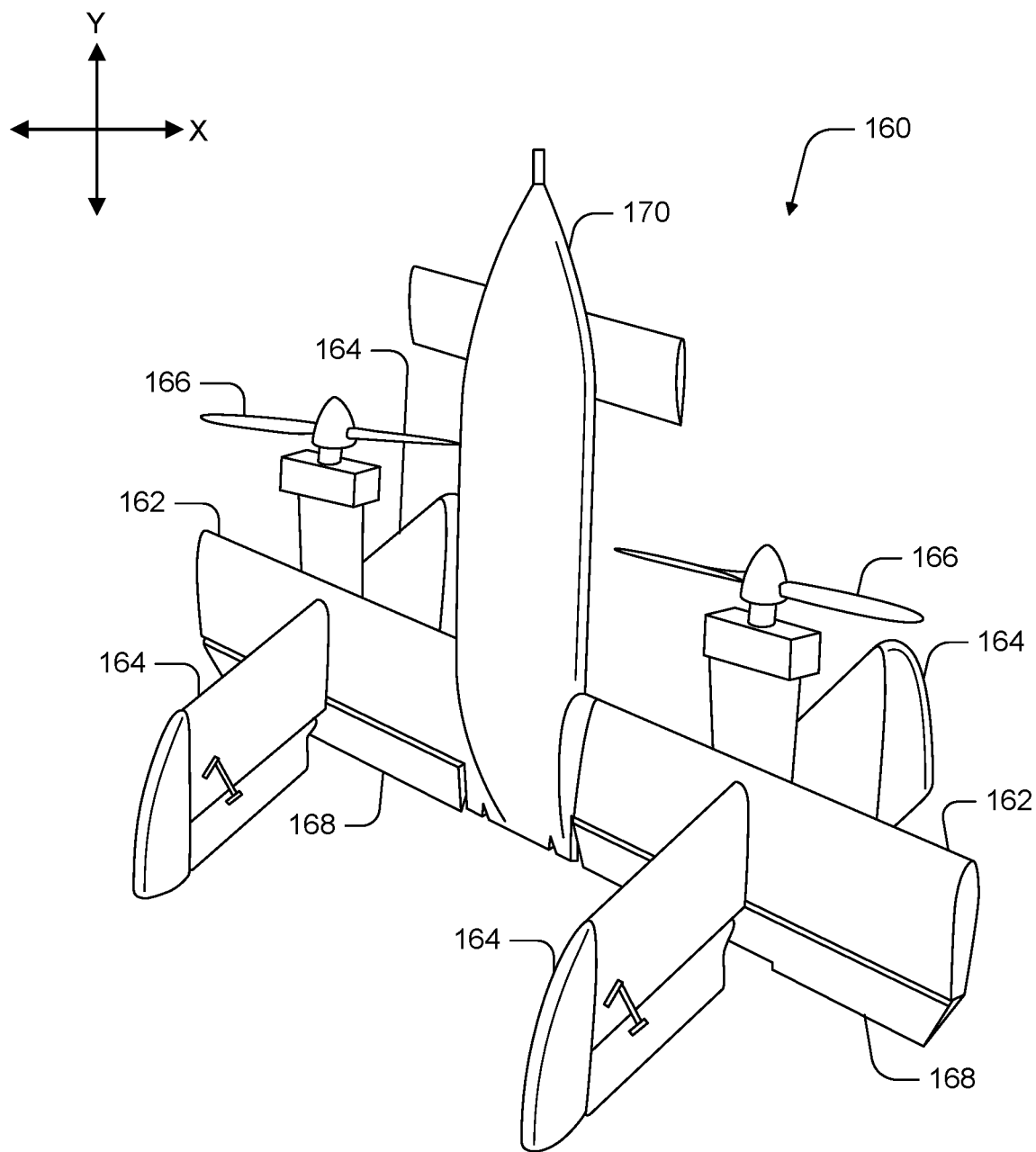
FIG. 1D is a simplified illustration of an unmanned aerial vehicle, according to example embodiments.

FIG. 1D shows an example of a tail-sitter UAV 160. In the illustrated example, the tail-sitter UAV 160 has fixed wings 162 to provide lift and allow the UAV 160 to glide horizontally (e.g., along the x-axis, in a position that is approximately perpendicular to the position shown in FIG. 1D). However, the fixed wings 162 also allow the tail-sitter UAV 160 to take off and land vertically on its own.

For example, at a launch site, the tail-sitter UAV 160 may be positioned vertically (as shown) with its fins 164 and/or wings 162 resting on the ground and stabilizing the UAV 160 in the vertical position. The tail-sitter UAV 160 may then take off by operating its propellers 166 to generate an upward thrust (e.g., a thrust that is generally along the y-axis). Once at a suitable altitude, the tail-sitter UAV 160 may use its flaps 168 to reorient itself in a horizontal position, such that its fuselage 170 is closer to being aligned with the x-axis than the y-axis. Positioned horizontally, the propellers 166 may provide forward thrust so that the tail-sitter UAV 160 can fly in a similar manner as a typical airplane.

Many variations on the illustrated fixed-wing UAVs are possible. For instance, fixed-wing UAVs may include more or fewer propellers, and/or may utilize a ducted fan or multiple ducted fans for propulsion. Further, UAVs with more wings (e.g., an "x-wing" configuration with four wings), with fewer wings, or even with no wings, are also possible.

Figure 1E:
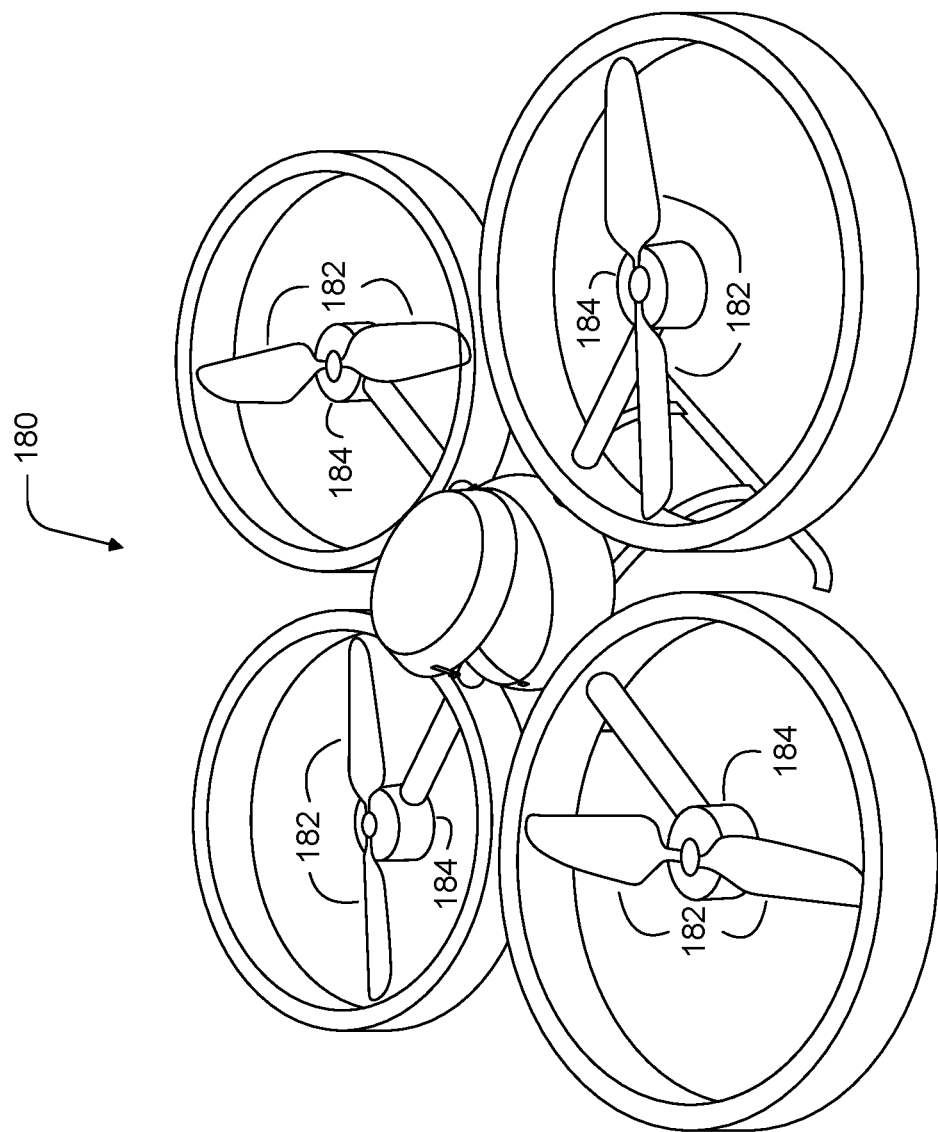
FIG. 1E is a simplified illustration of an unmanned aerial vehicle, according to example embodiments.

As noted above, some embodiments may involve other types of UAVs, in addition to or in the alternative to fixed-wing UAVs. For instance, FIG. 1E shows an example of a rotorcraft that is commonly referred to as a multicopter 180. The multicopter 180 may also be referred to as a quadcopter, as it includes four rotors 182. It should be understood that example embodiments may involve a rotorcraft with more or fewer rotors than the multicopter 180. For example, a helicopter typically has two rotors. Other examples with three or more rotors are possible as well. Herein, the term "multicopter" refers to any rotorcraft having more than two rotors, and the term "helicopter" refers to rotorcraft having two rotors.

Referring to the multicopter 180 in greater detail, the four rotors 182 provide propulsion and maneuverability for the multicopter 180. More specifically, each rotor 182 includes blades that are attached to a motor 184. Configured as such, the rotors 182 may allow the multicopter 180 to take off and land vertically, to maneuver in any direction, and/or to hover. Further, the pitch of the blades may be adjusted as a group and/or differentially, and may allow the multicopter 180 to control its pitch, roll, yaw, and/or altitude.

It should be understood that references herein to an "unmanned" aerial vehicle or UAV can apply equally to autonomous and semi-autonomous aerial vehicles. In an autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator can control high level navigation decisions for a UAV, such as by specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

More generally, it should be understood that the example UAVs described herein are not intended to be limiting. Example embodiments may relate to, be implemented within, or take the form of any type of unmanned aerial vehicle.

III. ILLUSTRATIVE UAV COMPONENTS

Figure 2:
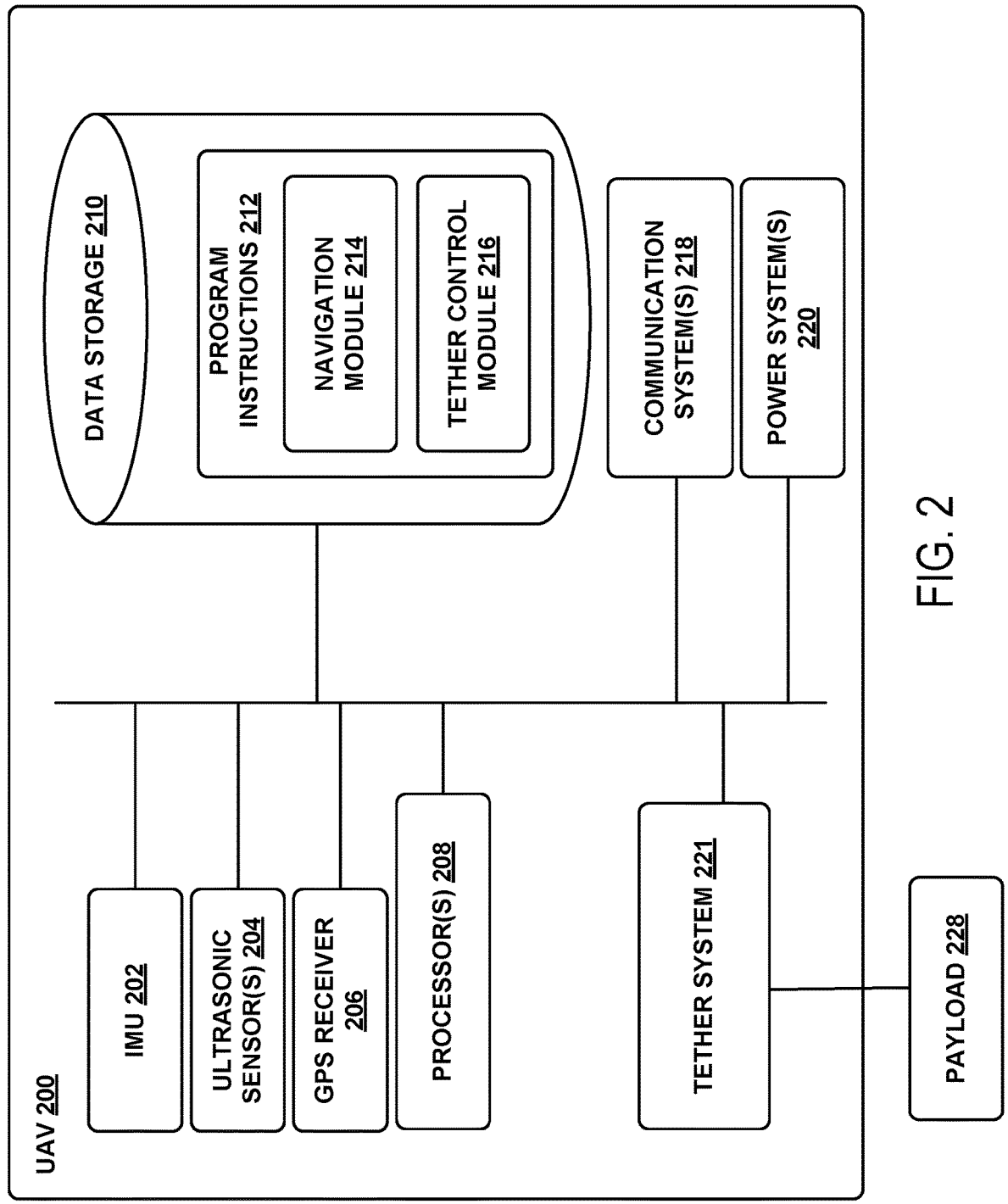
FIG. 2 is a simplified block diagram illustrating components of an unmanned aerial system, according to example embodiments.

FIG. 2 is a simplified block diagram illustrating components of a UAV 200, according to an example embodiment. UAV 200 may take the form of, or be similar in form to, one of the UAVs 100, 120, 140, 160, and 180 described in reference to FIGS. 1A-1E. However, UAV 200 may also take other forms.

UAV 200 may include various types of sensors, and may include a computing system configured to provide the functionality described herein. In the illustrated embodiment, the sensors of UAV 200 include an inertial measurement unit (IMU) 202, ultrasonic sensor(s) 204, and a GPS 206, among other possible sensors and sensing systems.

In the illustrated embodiment, UAV 200 also includes one or more processors 208. A processor 208 may be a general-purpose processor or a special purpose processor (e.g., digital signal processors, application specific integrated circuits, etc.). The one or more processors 208 can be configured to execute computer-readable program instructions 212 that are stored in the data storage 210 and are executable to provide the functionality of a UAV described herein.

The data storage 210 may include or take the form of one or more computer-readable storage media that can be read or accessed by at least one processor 208. The one or more computer-readable storage media can include volatile and/or non-volatile storage components, such as optical, magnetic, organic or other memory or disc storage, which can be integrated in whole or in part with at least one of the one or more processors 208. In some embodiments, the data storage 210 can be implemented using a single physical device (e.g., one optical, magnetic, organic or other memory or disc storage unit), while in other embodiments, the data storage 210 can be implemented using two or more physical devices.

As noted, the data storage 210 can include computer-readable program instructions 212 and perhaps additional data, such as diagnostic data of the UAV 200. As such, the data storage 210 may include program instructions 212 to perform or facilitate some or all of the UAV functionality described herein. For instance, in the illustrated embodiment, program instructions 212 include a navigation module 214 and a tether control module 216.

A. Sensors

In an illustrative embodiment, IMU 202 may include both an accelerometer and a gyroscope, which may be used together to determine an orientation of the UAV 200. In particular, the accelerometer can measure the orientation of the vehicle with respect to earth, while the gyroscope measures the rate of rotation around an axis. IMUs are commercially available in low-cost, low-power packages. For instance, an IMU 202 may take the form of or include a miniaturized MicroElectroMechanical System (MEMS) or a NanoElectroMechanical System (NEMS). Other types of IMUs may also be utilized.

An IMU 202 may include other sensors, in addition to accelerometers and gyroscopes, which may help to better determine position and/or help to increase autonomy of the UAV 200. Two examples of such sensors are magnetometers and pressure sensors. In some embodiments, a UAV may include a low-power, digital 3-axis magnetometer, which can be used to realize an orientation independent electronic compass for accurate heading information. However, other types of magnetometers may be utilized as well. Other examples are also possible. Further, note that a UAV can include some or all of the above-described inertia sensors as separate components from an IMU.

UAV 200 may also include a pressure sensor or barometer, which can be used to determine the altitude of the UAV 200. Alternatively, other sensors, such as sonic altimeters or radar altimeters, can be used to provide an indication of altitude, which may help to improve the accuracy of and/or prevent drift of an IMU.

In a further aspect, UAV 200 may include one or more sensors that allow the UAV to sense objects in the environment. For instance, in the illustrated embodiment, UAV 200 includes ultrasonic sensor(s) 204. Ultrasonic sensor(s) 204 can determine the distance to an object by generating sound waves and determining the time interval between transmission of the wave and receiving the corresponding echo off an object. A typical application of an ultrasonic sensor for unmanned vehicles or IMUs is low-level altitude control and obstacle avoidance. An ultrasonic sensor can also be used for vehicles that need to hover at a certain height or need to be capable of detecting obstacles. Other systems can be used to determine, sense the presence of, and/or determine the distance to nearby objects, such as a light detection and ranging (LIDAR) system, laser detection and ranging (LADAR) system, and/or an infrared or forward-looking infrared (FLIR) system, among other possibilities.

In some embodiments, UAV 200 may also include one or more imaging system(s). For example, one or more still and/or video cameras may be utilized by UAV 200 to capture image data from the UAV's environment. As a specific example, charge-coupled device (CCD) cameras or complementary metal-oxide-semiconductor (CMOS) cameras can be used with unmanned vehicles. Such imaging sensor(s) have numerous possible applications, such as obstacle avoidance, localization techniques, ground tracking for more accurate navigation (e.g., by applying optical flow techniques to images), video feedback, and/or image recognition and processing, among other possibilities.

UAV 200 may also include a GPS receiver 206. The GPS receiver 206 may be configured to provide data that is typical of well-known GPS systems, such as the GPS coordinates of the UAV 200. Such GPS data may be utilized by the UAV 200 for various functions. As such, the UAV may use its GPS receiver 206 to help navigate to the caller's location, as indicated, at least in part, by the GPS coordinates provided by their mobile device. Other examples are also possible.

B. Navigation and Location Determination

The navigation module 214 may provide functionality that allows the UAV 200 to, e.g., move about its environment and reach a desired location. To do so, the navigation module 214 may control the altitude and/or direction of flight by controlling the mechanical features of the UAV that affect flight (e.g., its rudder(s), elevator(s), aileron(s), and/or the speed of its propeller(s)).

In order to navigate the UAV 200 to a target location (e.g., a delivery location), the navigation module 214 may implement various navigation techniques, such as map-based navigation and localization-based navigation, for instance. With map-based navigation, the UAV 200 may be provided with a map of its environment, which may then be used to navigate to a particular location on the map. With localization-based navigation, the UAV 200 may be capable of navigating in an unknown environment using localization. Localization-based navigation may involve the UAV 200 building its own map of its environment and calculating its position within the map and/or the position of objects in the environment. For example, as a UAV 200 moves throughout its environment, the UAV 200 may continuously use localization to update its map of the environment. This continuous mapping process may be referred to as simultaneous localization and mapping (SLAM). Other navigation techniques may also be utilized.

In some embodiments, the navigation module 214 may navigate using a technique that relies on waypoints. In particular, waypoints are sets of coordinates that identify points in physical space. For instance, an air-navigation waypoint may be defined by a certain latitude, longitude, and altitude. Accordingly, navigation module 214 may cause UAV 200 to move from waypoint to waypoint, in order to ultimately travel to a final destination (e.g., a final waypoint in a sequence of waypoints).

In a further aspect, the navigation module 214 and/or other components and systems of the UAV 200 may be configured for "localization" to more precisely navigate to the scene of a target location. More specifically, it may be desirable in certain situations for a UAV to be within a threshold distance of the target location where a payload 228 is being delivered by a UAV (e.g., within a few feet of the target destination). To this end, a UAV may use a two-tiered approach in which it uses a more-general location-determination technique to navigate to a general area that is associated with the target location, and then use a more-refined location-determination technique to identify and/or navigate to the target location within the general area.

For example, the UAV 200 may navigate to the general area of a target destination where a payload 228 is being delivered using waypoints and/or map-based navigation. The UAV may then switch to a mode in which it utilizes a localization process to locate and travel to a more specific location. For instance, if the UAV 200 is to deliver a payload to a user's home, the UAV 200 may need to be substantially close to the target location in order to avoid delivery of the payload to undesired areas (e.g., onto a roof, into a pool, onto a neighbor's property, etc.). However, a GPS signal may only get the UAV 200 so far (e.g., within a block of the user's home). A more precise location-determination technique may then be used to find the specific target location.

Various types of location-determination techniques may be used to accomplish localization of the target delivery location once the UAV 200 has navigated to the general area of the target delivery location. For instance, the UAV 200 may be equipped with one or more sensory systems, such as, for example, ultrasonic sensors 204, infrared sensors (not shown), and/or other sensors, which may provide input that the navigation module 214 utilizes to navigate autonomously or semi-autonomously to the specific target location.

As another example, once the UAV 200 reaches the general area of the target delivery location (or of a moving subject such as a person or their mobile device), the UAV 200 may switch to a "fly-by-wire" mode where it is controlled, at least in part, by a remote operator, who can navigate the UAV 200 to the specific target location. To this end, sensory data from the UAV 200 may be sent to the remote operator to assist them in navigating the UAV 200 to the specific location.

As yet another example, the UAV 200 may include a module that is able to signal to a passer-by for assistance in either reaching the specific target delivery location; for example, the UAV 200 may display a visual message requesting such assistance in a graphic display, play an audio message or tone through speakers to indicate the need for such assistance, among other possibilities. Such a visual or audio message might indicate that assistance is needed in delivering the UAV 200 to a particular person or a particular location, and might provide information to assist the passer-by in delivering the UAV 200 to the person or location (e.g., a description or picture of the person or location, and/or the person or location's name), among other possibilities. Such a feature can be useful in a scenario in which the UAV is unable to use sensory functions or another location-determination technique to reach the specific target location. However, this feature is not limited to such scenarios.

In some embodiments, once the UAV 200 arrives at the general area of a target delivery location, the UAV 200 may utilize a beacon from a user's remote device (e.g., the user's mobile phone) to locate the person. Such a beacon may take various forms. As an example, consider the scenario where a remote device, such as the mobile phone of a person who requested a UAV delivery, is able to send out directional signals (e.g., via an RF signal, a light signal and/or an audio signal). In this scenario, the UAV 200 may be configured to navigate by "sourcing" such directional signals—in other words, by determining where the signal is strongest and navigating accordingly. As another example, a mobile device can emit a frequency, either in the human range or outside the human range, and the UAV 200 can listen for that frequency and navigate accordingly. As a related example, if the UAV 200 is listening for spoken commands, then the UAV 200 can utilize spoken statements, such as "I'm over here!" to source the specific location of the person requesting delivery of a payload.

In an alternative arrangement, a navigation module may be implemented at a remote computing device, which communicates wirelessly with the UAV 200. The remote computing device may receive data indicating the operational state of the UAV 200, sensor data from the UAV 200 that allows it to assess the environmental conditions being experienced by the UAV 200, and/or location information for the UAV 200. Provided with such information, the remote computing device may determine altitudinal and/or directional adjustments that should be made by the UAV 200 and/or may determine how the UAV 200 should adjust its mechanical features (e.g., its rudder(s), elevator(s), aileron(s), and/or the speed of its propeller(s)) in order to effectuate such movements. The remote computing system may then communicate such adjustments to the UAV 200 so it can move in the determined manner.

C. Communication Systems

In a further aspect, the UAV 200 includes one or more communication systems 218. The communications systems 218 may include one or more wireless interfaces and/or one or more wireline interfaces, which allow the UAV 200 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network.

In some embodiments, a UAV 200 may include communication systems 218 that allow for both short-range communication and long-range communication. For example, the UAV 200 may be configured for short-range communications using Bluetooth and for long-range communications under a CDMA protocol. In such an embodiment, the UAV 200 may be configured to function as a "hot spot;" or in other words, as a gateway or proxy between a remote support device and one or more data networks, such as a cellular network and/or the Internet. Configured as such, the UAV 200 may facilitate data communications that the remote support device would otherwise be unable to perform by itself.

For example, the UAV 200 may provide a WiFi connection to a remote device, and serve as a proxy or gateway to a cellular service provider's data network, which the UAV might connect to under an LTE or a 3G protocol, for instance. The UAV 200 can also serve as a proxy or gateway to a high-altitude balloon network, a satellite network, or a combination of these networks, among others, which a remote device might not be able to otherwise access.

D. Power Systems

In a further aspect, the UAV 200 may include power system(s) 220. The power system 220 may include one or more batteries for providing power to the UAV 200. In one example, the one or more batteries may be rechargeable and each battery may be recharged via a wired connection between the battery and a power supply and/or via a wireless charging system, such as an inductive charging system that applies an external time-varying magnetic field to an internal battery.

In a further aspect, the power systems 220 of UAV 200 a power interface for electronically coupling to an external AC power source, and an AC/DC converter coupled to the power interface and operable to convert alternating current to direct current that charges the UAV's battery or batteries. For instance, the power interface may include a power jack or other electric coupling for connecting to a 110V, 120V, 220V, or 240V AC power source. Such a power system may facilitate a recipient-assisted recharging process, where a recipient can connect the UAV to a standard power source at a delivery location, such as the recipient's home or office. Additionally or alternatively, power systems 220 can include an inductive charging interface, such that recipient-assisted recharging can be accomplished wirelessly via an inductive charging system installed or otherwise available at the delivery location.

E. Payload Delivery

The UAV 200 may employ various systems and configurations in order to transport and deliver a payload 228. In some implementations, the payload 228 of a given UAV 200 may include or take the form of a "package" designed to transport various goods to a target delivery location. For example, the UAV 200 can include a compartment, in which an item or items may be transported. Such a package may one or more food items, purchased goods, medical items, or any other object(s) having a size and weight suitable to be transported between two locations by the UAV. In some embodiments, a payload 228 may simply be the one or more items that are being delivered (e.g., without any package housing the items). And, in some embodiments, the items being delivered, the container or package in which the items are transported, and/or other components may all be considered to be part of the payload.

In some embodiments, the payload 228 may be attached to the UAV and located substantially outside of the UAV during some or all of a flight by the UAV. For example, the package may be tethered or otherwise releasably attached below the UAV during flight to a target location. In an embodiment where a package carries goods below the UAV, the package may include various features that protect its contents from the environment, reduce aerodynamic drag on the system, and prevent the contents of the package from shifting during UAV flight.

For instance, when the payload 228 takes the form of a package for transporting items, the package may include an outer shell constructed of water-resistant cardboard, plastic, or any other lightweight and water-resistant material. Further, in order to reduce drag, the package may feature smooth surfaces with a pointed front that reduces the frontal cross-sectional area. Further, the sides of the package may taper from a wide bottom to a narrow top, which allows the package to serve as a narrow pylon that reduces interference effects on the wing(s) of the UAV. This may move some of the frontal area and volume of the package away from the wing(s) of the UAV, thereby preventing the reduction of lift on the wing(s) cause by the package. Yet further, in some embodiments, the outer shell of the package may be constructed from a single sheet of material in order to reduce air gaps or extra material, both of which may increase drag on the system. Additionally or alternatively, the package may include a stabilizer to dampen package flutter. This reduction in flutter may allow the package to have a less rigid connection to the UAV and may cause the contents of the package to shift less during flight.

In order to deliver the payload, the UAV may include a tether system 221, which may be controlled by the tether control module 216 in order to lower the payload 228 to the ground while the UAV hovers above. The tether system 221 may include a tether, which is couplable to a payload 228 (e.g., a package). The tether 224 may be wound on a spool that is coupled to a motor 222 of the UAV (although passive implementations, without a motor, are also possible). The motor may be a DC motor (e.g., a servo motor) that can be actively controlled by a speed controller, although other motor configurations are possible. In some embodiments, the tether control module 216 can control the speed controller to cause the 222 to rotate the spool, thereby unwinding or retracting the tether and lowering or raising the payload coupling apparatus. In practice, a speed controller may output a desired operating rate (e.g., a desired RPM) for the spool, which may correspond to the speed at which the tether system should lower the payload towards the ground. The motor may then rotate the spool so that it maintains the desired operating rate (or within some allowable range of operating rates).

In order to control the motor via a speed controller, the tether control module 216 may receive data from a speed sensor (e.g., an encoder) configured to convert a mechanical position to a representative analog or digital signal. In particular, the speed sensor may include a rotary encoder that may provide information related to rotary position (and/or rotary movement) of a shaft of the motor or the spool coupled to the motor, among other possibilities. Moreover, the speed sensor may take the form of an absolute encoder and/or an incremental encoder, among others. So in an example implementation, as the motor causes rotation of the spool, a rotary encoder may be used to measure this rotation. In doing so, the rotary encoder may be used to convert a rotary position to an analog or digital electronic signal used by the tether control module 216 to determine the amount of rotation of the spool from a fixed reference angle and/or to an analog or digital electronic signal that is representative of a new rotary position, among other options. Other examples are also possible.

In some embodiments, a payload coupling component (e.g., a hook or another type of coupling component) can be configured to secure the payload 228 while being lowered from the UAV by the tether. The coupling apparatus or component and can be further configured to release the payload 228 upon reaching ground level via electrical or electro-mechanical features of the coupling component. The payload coupling component can then be retracted to the UAV by reeling in the tether using the motor.

In some implementations, the payload 228 may be passively released once it is lowered to the ground. For example, a payload coupling component may provide a passive release mechanism, such as one or more swing arms adapted to retract into and extend from a housing. An extended swing arm may form a hook on which the payload 228 may be attached. Upon lowering the release mechanism and the payload 228 to the ground via a tether, a gravitational force as well as a downward inertial force on the release mechanism may cause the payload 228 to detach from the hook allowing the release mechanism to be raised upwards toward the UAV. The release mechanism may further include a spring mechanism that biases the swing arm to retract into the housing when there are no other external forces on the swing arm. For instance, a spring may exert a force on the swing arm that pushes or pulls the swing arm toward the housing such that the swing arm retracts into the housing once the weight of the payload 228 no longer forces the swing arm to extend from the housing. Retracting the swing arm into the housing may reduce the likelihood of the release mechanism snagging the payload 228 or other nearby objects when raising the release mechanism toward the UAV upon delivery of the payload 228.

In another implementation, a payload coupling component may include a hook feature that passively releases the payload when the payload contacts the ground. For example, the payload coupling component may take the form of or include a hook feature that is sized and shaped to interact with a corresponding attachment feature (e.g., a handle or hole) on a payload taking the form of a container or tote. The hook may be inserted into the handle or hole of the payload container, such that the weight of the payload keeps the payload container secured to the hook feature during flight. However, the hook feature and payload container may be designed such that when the container contacts the ground and is supported from below, the hook feature slides out of the container's attachment feature, thereby passively releasing the payload container. Other passive release configurations are also possible.

Active payload release mechanisms are also possible. For example, sensors such as a barometric pressure based altimeter and/or accelerometers may help to detect the position of the release mechanism (and the payload) relative to the ground. Data from the sensors can be communicated back to the UAV and/or a control system over a wireless link and used to help in determining when the release mechanism has reached ground level (e.g., by detecting a measurement with the accelerometer that is characteristic of ground impact). In other examples, the UAV may determine that the payload has reached the ground based on a weight sensor detecting a threshold low downward force on the tether and/or based on a threshold low measurement of power drawn by the winch when lowering the payload.

Other systems and techniques for delivering a payload, in addition or in the alternative to a tethered delivery system are also possible. For example, a UAV 200 can include an air-bag drop system or a parachute drop system. Alternatively, a UAV 200 carrying a payload can simply land on the ground at a delivery location. Other examples are also possible.

In some arrangements, a UAV may not include a tether system 221. For example, a UAV can include an internal compartment or bay in which the UAV can hold items during transport. Such a compartment can be configured as a top-loading, side-loading, and/or bottom-loading chamber. The UAV may include electrical and/or mechanical means (e.g., doors) that allow the interior compartment in the UAV to be opened and closed. Accordingly, the UAV may open the compartment in various circumstances, such as: (a) when picking up an item for delivery at an item source location, such that the item can be placed in the UAV for delivery, (b) upon arriving at a delivery location, such that the recipient can place an item for return into the UAV, and/or (c) in other circumstances. Further, it is also contemplated, that other non-tethered mechanisms for securing payload items to a UAV are also possible, such as various fasteners for securing items to the UAV housing, among other possibilities. Yet further, a UAV may include an internal compartment for transporting items and/or other non-tethered mechanisms for securing payload items, in addition or in the alternative to a tether system 221.

IV. ILLUSTRATIVE UAV DEPLOYMENT SYSTEMS

Figure 3:
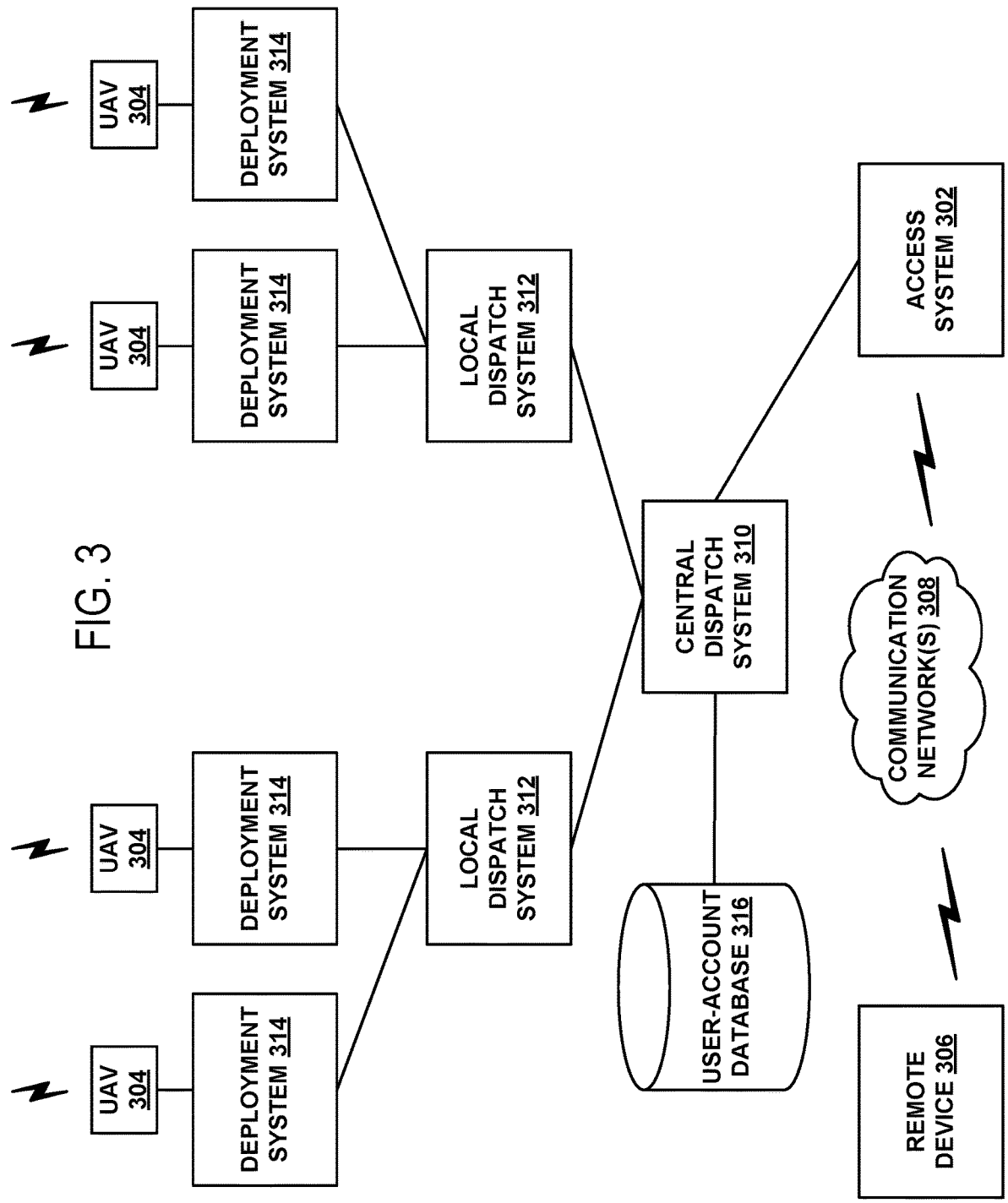
FIG. 3 is a simplified block diagram illustrating a distributed UAV system, according to example embodiments.

UAV systems may be implemented in order to provide various UAV-related services. In particular, UAVs may be provided at a number of different launch sites that may be in communication with regional and/or central control systems. Such a distributed UAV system may allow UAVs to be quickly deployed to provide services across a large geographic area (e.g., that is much larger than the flight range of any single UAV). For example, UAVs capable of carrying payloads may be distributed at a number of launch sites across a large geographic area (possibly even throughout an entire country, or even worldwide), in order to provide on-demand transport of various items to locations throughout the geographic area. FIG. 3 is a simplified block diagram illustrating a distributed UAV system 300, according to an example embodiment.

In the illustrative UAV system 300, an access system 302 may allow for interaction with, control of, and/or utilization of a network of UAVs 304. In some embodiments, an access system 302 may be a computing system that allows for human-controlled dispatch of UAVs 304. As such, the control system may include or otherwise provide a user interface through which a user can access and/or control the UAVs 304.

In some embodiments, dispatch of the UAVs 304 may additionally or alternatively be accomplished via one or more automated processes. For instance, the access system 302 may dispatch one of the UAVs 304 to transport a payload to a target location, and the UAV may autonomously navigate to the target location by utilizing various on-board sensors, such as a GPS receiver and/or other various navigational sensors.

Further, the access system 302 may provide for remote operation of a UAV. For instance, the access system 302 may allow an operator to control the flight of a UAV via its user interface. As a specific example, an operator may use the access system 302 to dispatch a UAV 304 to a target location. The UAV 304 may then autonomously navigate to the general area of the target location. At this point, the operator may use the access system 302 to take control of the UAV 304 and navigate the UAV to the target location (e.g., to a particular person to whom a payload is being transported). Other examples of remote operation of a UAV are also possible.

In an illustrative embodiment, the UAVs 304 may take various forms. For example, each of the UAVs 304 may be a UAV such as those illustrated in FIG. 1, 2, 3, or 4. However, UAV system 300 may also utilize other types of UAVs without departing from the scope of the invention. In some implementations, all of the UAVs 304 may be of the same or a similar configuration. However, in other implementations, the UAVs 304 may include a number of different types of UAVs. For instance, the UAVs 304 may include a number of types of UAVs, with each type of UAV being configured for a different type or types of payload delivery capabilities.

The UAV system 300 may further include a remote device 306, which may take various forms. Generally, the remote device 306 may be any device through which a direct or indirect request to dispatch a UAV can be made. (Note that an indirect request may involve any communication that may be responded to by dispatching a UAV, such as requesting a package delivery). In an example embodiment, the remote device 306 may be a mobile phone, tablet computer, laptop computer, personal computer, or any network-connected computing device. Further, in some instances, the remote device 306 may not be a computing device. As an example, a standard telephone, which allows for communication via plain old telephone service (POTS), may serve as the remote device 306. Other types of remote devices are also possible.

Further, the remote device 306 may be configured to communicate with access system 302 via one or more types of communication network(s) 308. For example, the remote device 306 may communicate with the access system 302 (or a human operator of the access system 302) by communicating over a POTS network, a cellular network, and/or a data network such as the Internet. Other types of networks may also be utilized.

In some embodiments, the remote device 306 may be configured to allow a user to request pickup of one or more items from a certain source location and/or delivery of one or more items to a desired location. For example, a user can request UAV delivery of a package to their home via their mobile phone, tablet, or laptop. As another example, a user can request dynamic delivery to wherever they are located at the time of delivery. To provide such dynamic delivery, the UAV system 300 may receive location information (e.g., GPS coordinates, etc.) from the user's mobile phone, or any other device on the user's person, such that a UAV can navigate to the user's location (as indicated by their mobile phone).

In some embodiments, a business user (e.g., a restaurant) can utilize one or more remote devices 306 to request that a UAV be dispatched to pick up one or more items (e.g., a food order) from a source location (e.g., the restaurant's address), and then deliver the one or more items to a target location (e.g., a customer's address). Further, in such embodiments, there may be a number of remote devices 306 associated with a common item-provider account (e.g., an account used by multiple employees and/or owners of a particular restaurant). Additionally, in such embodiments, a remote device 306 may be utilized to send item-provider submissions to a transport-provider computing system (e.g., central dispatch system 310 and or local dispatch system 312), which each indicate a respective quantitative measure for a given amount of UAV transport service at a given future time. For example, remote device 306 may be utilized to generate and send an item-provider submission that specifies a level of desired UAV transport services (e.g., number and/or rate of expected UAV delivery flights), and/or a monetary value corresponding to the item provider's need for UAV transport services, at a particular time or during a particular period of time in the future.

In an illustrative arrangement, the central dispatch system 310 may be a server or group of servers, which is configured to receive dispatch messages requests and/or dispatch instructions from the access system 302. Such dispatch messages may request or instruct the central dispatch system 310 to coordinate the deployment of UAVs to various target locations. The central dispatch system 310 may be further configured to route such requests or instructions to one or more local dispatch systems 312. To provide such functionality, the central dispatch system 310 may communicate with the access system 302 via a data network, such as the Internet or a private network that is established for communications between access systems and automated dispatch systems.

In the illustrated configuration, the central dispatch system 310 may be configured to coordinate the dispatch of UAVs 304 from a number of different local dispatch systems 312. As such, the central dispatch system 310 may keep track of which UAVs 304 are located at which local dispatch systems 312, which UAVs 304 are currently available for deployment, and/or which services or operations each of the UAVs 304 is configured for (in the event that a UAV fleet includes multiple types of UAVs configured for different services and/or operations). Additionally or alternatively, each local dispatch system 312 may be configured to track which of its associated UAVs 304 are currently available for deployment and/or are currently in the midst of item transport.

In some cases, when the central dispatch system 310 receives a request for UAV-related service (e.g., transport of an item) from the access system 302, the central dispatch system 310 may select a specific UAV 304 to dispatch. The central dispatch system 310 may accordingly instruct the local dispatch system 312 that is associated with the selected UAV to dispatch the selected UAV. The local dispatch system 312 may then operate its associated deployment system 314 to launch the selected UAV. In other cases, the central dispatch system 310 may forward a request for a UAV-related service to a local dispatch system 312 that is near the location where the support is requested and leave the selection of a particular UAV 304 to the local dispatch system 312.

In an example configuration, the local dispatch system 312 may be implemented as a computing system at the same location as the deployment system(s) 314 that it controls. For example, the local dispatch system 312 may be implemented by a computing system installed at a building, such as a warehouse, where the deployment system(s) 314 and UAV(s) 304 that are associated with the particular local dispatch system 312 are also located. In other embodiments, the local dispatch system 312 may be implemented at a location that is remote to its associated deployment system(s) 314 and UAV(s) 304.

Numerous variations on and alternatives to the illustrated configuration of the UAV system 300 are possible. For example, in some embodiments, a user of the remote device 306 can request delivery of a package directly from the central dispatch system 310. To do so, an application may be implemented on the remote device 306 that allows the user to provide information regarding a requested delivery, and generate and send a data message to request that the UAV system 300 provide the delivery. In such an embodiment, the central dispatch system 310 may include automated functionality to handle requests that are generated by such an application, evaluate such requests, and, if appropriate, coordinate with an appropriate local dispatch system 312 to deploy a UAV.

Further, some or all of the functionality that is attributed herein to the central dispatch system 310, the local dispatch system(s) 312, the access system 302, and/or the deployment system(s) 314 may be combined in a single system, implemented in a more complex system (e.g., having more layers of control), and/or redistributed among the central dispatch system 310, the local dispatch system(s) 312, the access system 302, and/or the deployment system(s) 314 in various ways.

Yet further, while each local dispatch system 312 is shown as having two associated deployment systems 314, a given local dispatch system 312 may alternatively have more or fewer associated deployment systems 314. Similarly, while the central dispatch system 310 is shown as being in communication with two local dispatch systems 312, the central dispatch system 310 may alternatively be in communication with more or fewer local dispatch systems 312.

In a further aspect, the deployment systems 314 may take various forms. In some implementations, some or all of the deployment systems 314 may be a structure or system that passively facilitates a UAV taking off from a resting position to begin a flight. For example, some or all of the deployment systems 314 may take the form of a landing pad, a hangar, and/or a runway, among other possibilities. As such, a given deployment system 314 may be arranged to facilitate deployment of one UAV 304 at a time, or deployment of multiple UAVs (e.g., a landing pad large enough to be utilized by multiple UAVs concurrently).

Additionally or alternatively, some or all of deployment systems 314 may take the form of or include systems for actively launching one or more of the UAVs 304. Such launch systems may include features that provide for an automated UAV launch and/or features that allow for a human-assisted UAV launch. Further, a given deployment system 314 may be configured to launch one particular UAV 304, or to launch multiple UAVs 304.

Note that deployment systems 314 may also be configured to passively facilitate and/or actively assist a UAV when landing. For example, the same landing pad can be used for take-off and landing. Additionally or alternatively, a deployment system can include a robotic arm operable to receive an incoming UAV. A deployment system 314 can also include other structures and/or systems to assist and/or facilitate UAV landing processes. Further, structures and/or systems to assist and/or facilitate UAV landing processes may be implemented as separate structures and/or systems, so long as UAVs can move or be moved from a landing structure or system to a deployment system 314 for re-deployment.

The deployment systems 314 may further be configured to provide additional functions, including for example, diagnostic-related functions such as verifying system functionality of the UAV, verifying functionality of devices that are housed within a UAV (e.g., a payload delivery apparatus), and/or maintaining devices or other items that are housed in the UAV (e.g., by monitoring a status of a payload such as its temperature, weight, etc.).

In some embodiments, local dispatch systems 312 (along with their respective deployment system(s) 314 may be strategically distributed throughout an area such as a city. For example, local dispatch systems 312 may be strategically distributed such that each local dispatch systems 312 is proximate to one or more payload pickup locations (e.g., near a restaurant, store, or warehouse). However, the local dispatch systems 312 may be distributed in other ways, depending upon the particular implementation.

As an additional example, kiosks that allow users to transport packages via UAVs may be installed in various locations. Such kiosks may include UAV launch systems, and may allow a user to provide their package for loading onto a UAV and pay for UAV shipping services, among other possibilities. Other examples are also possible.

In a further aspect, the UAV system 300 may include or have access to a user-account database 316. The user-account database 316 may include data for a number of user accounts, and which are each associated with one or more person. For a given user account, the user-account database 316 may include data related to or useful in providing UAV-related services. Typically, the user data associated with each user account is optionally provided by an associated user and/or is collected with the associated user's permission.

Further, in some embodiments, a person may be required to register for a user account with the UAV system 300, if they wish to be provided with UAV-related services by the UAVs 304 from UAV system 300. As such, the user-account database 316 may include authorization information for a given user account (e.g., a user name and password), and/or other information that may be used to authorize access to a user account.

In some embodiments, a person may associate one or more of their devices with their user account, such that they can access the services of UAV system 300. For example, when a person uses an associated mobile phone to, e.g., place a call to an operator of the access system 302 or send a message requesting a UAV-related service to a dispatch system, the phone may be identified via a unique device identification number, and the call or message may then be attributed to the associated user account. Other examples are also possible.

Additionally or alternatively, an item provider that wishes to deliver their products using UAV transport services provided by an ATSP to deliver, can register for an item-provider account with the UAV system 300. As such, the user-account database 316 may include authorization information for a given item-provider account (e.g., one or more user name and password combinations), and/or other information that may be used to authorize access to a given item-provider account. Alternatively, data for item-provider accounts may be kept in a separate database from recipient user accounts. Other data structures and storage configurations for storing such account data are also possible.

V. UAV TRANSPORT SERVICES WITH SEPARATELY LOCATED ITEM PROVIDERS AND UAV HUBS

As noted above, an ATSP may be a separate entity from the entity or entities that provide the items being transported and/or interface with the recipients who request delivery of these items. For example, a company that operates a fleet of UAVs configured for item delivery may provide delivery services for third-party entities, such as restaurants, clothing stores, grocery stores, and other "brick and mortar" and/or online retailers, among other possibilities. These third-party entities may have accounts with the UAV transport service provider, via which the third-parties can request and/or purchase UAV transport services from the transport service provider. Further, the third-party entities can interface with recipients (e.g., customers) directly, or through computing systems (e.g., applications and/or server systems) provided by the UAV transport service provider.

Figure 4:
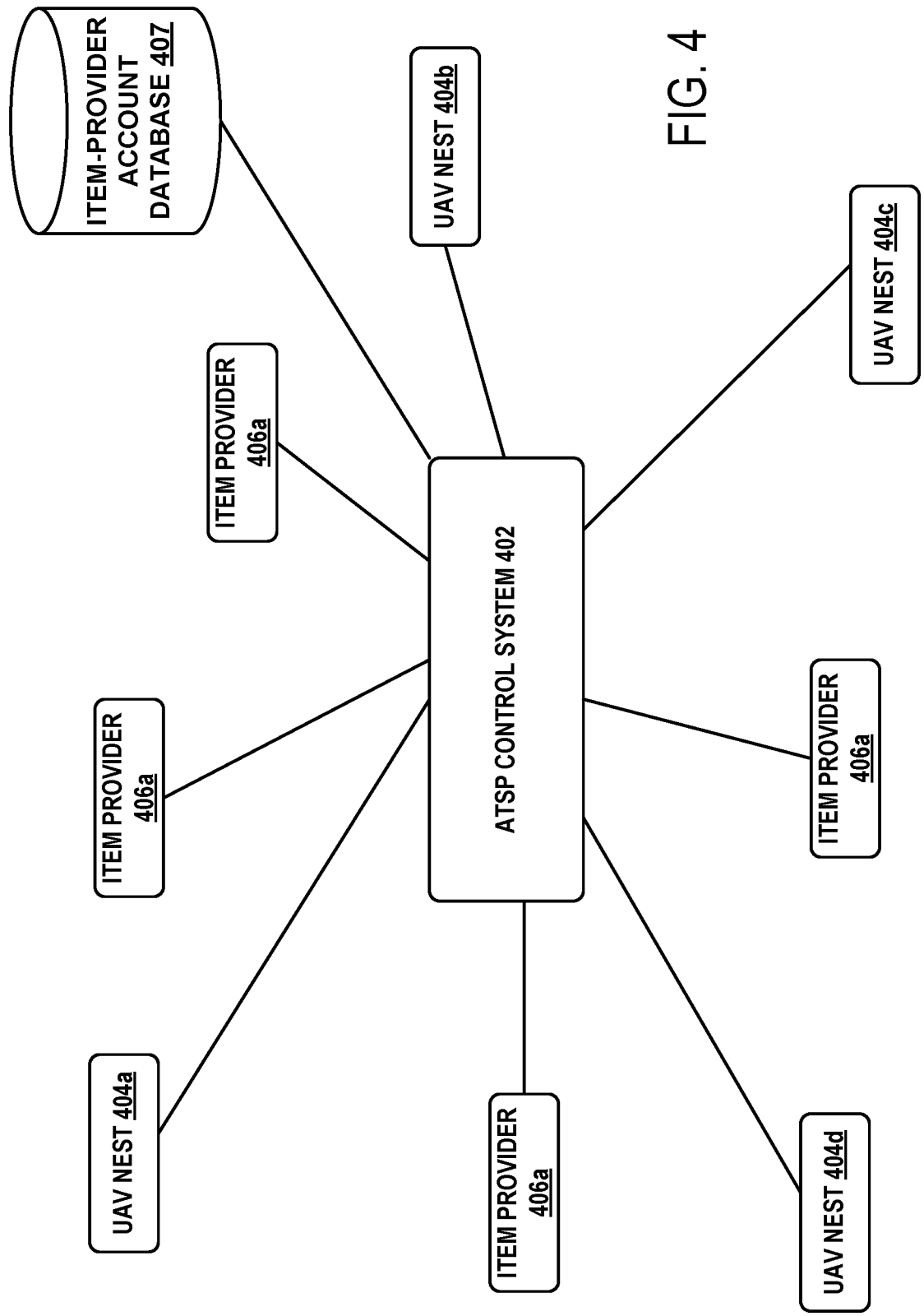
FIG. 4 is a block diagram showing an example arrangement for an aerial transport provider control system, according to example embodiments.

FIG. 4 is a block diagram showing an example arrangement for an aerial transport provider control system 402, which coordinates UAV transport services for a plurality of item providers that are located remotely from the service provider's dispatch locations, and served by a plurality of UAV hubs at various locations. As shown, an aerial transport service provider (ATSP) 402 may be communicatively coupled to UAV nests 404a to 404d, and communicatively coupled to item-provider computing systems 406a to 406d. Such communicative couplings may be implemented using various types of wired and/or wireless communication protocols and networks.

Each UAV nest 404a to 404d is a facility where UAVs can be stored for at least a short period of time, and from which UAVs can begin carrying out a UAV transport task (e.g., where UAVs can take off). In some implementations, some or all of UAV nests 404a to 404d may take the form of a local dispatch system and one or more deployment systems, such as those described in reference to FIG. 3 above. Of course, some or all UAV nests 404a to 404d can also take other forms and/or perform different functions.

Each item-provider computing system 406a to 406d may be associated with a different item-provider account. As such, a given item-provider computing system 406a to 406d may include one or more computing devices that are authorized to access the corresponding item-provider account with ATSP 402. Further, ATSP 402 may store data for item-provider accounts in an item-provider account database 407.

In practice, a given item-provider computing system 406a to 406d may include one or more remote computing devices (e.g., such as one or more remote devices 306 described in reference to FIG. 3), which have logged in to or otherwise been authorized to access the same item-provider account (e.g., cell phones, laptops, and/or computing devices of a business's employees). Additionally or alternatively, an item-provider computing system 406a to 406d may be implemented with less of an ad-hoc approach; e.g., with one or more dedicated user-interface terminals installed at the item provider's facilities. Other types of item-provider computing systems are also possible.

In order to provide UAV transport services to various item providers in an efficient and flexible manner, a UAV transport service provider 402 may dynamically assign different UAVs to transport tasks for different item providers based on demand and/or other factors, rather than permanently assigning each UAV to a particular item provider. As such, the particular UAV or UAVs that carry out transport tasks for a given third-party item provider may vary over time.

The dynamic assignment of UAVs to flights for a number of different item providers can help a UAV transport service provider to more efficiently utilize a group of UAVs (e.g., by reducing unnecessary UAV downtime), as compared to an arrangement where specific UAVs are permanently assigned to specific item providers. More specifically, to dynamically assign UAVs to transport requests from third-party item providers, the UAV transport service provider 402 can dynamically redistribute UAVs amongst a number of UAV deployment locations (which may be referred to as, e.g., "hubs" or "nests") through a service area, according to time-varying levels of demand at various locations or sub-areas within the service area.

With such an arrangement, a delivery flight may involve the additional flight leg to fly from the UAV hub to the item-provider's location to pick up the item or items for transport, before flying to the delivery location, as compared to an arrangement where delivery UAVs are stationed at the source location for items (such as a distributor or retailer warehouse or a restaurant). While the flight leg between the UAV hub and a pickup location has associated costs, these costs can be offset by more efficient use of each UAV (e.g., more flights, and less unnecessary ground time, in a given period of time), which in turn can allow for a lesser number of UAVs to be utilized for a given number of transport tasks.

VI. DEPLOYMENT OF OPERATIONAL INFRASTRUCTURE

In accordance with the present disclosure, a UAV can be arranged to deploy operational infrastructure. Generally, operational infrastructure may be any structure, device, or equipment that can be deployed in order to enable charging of a UAV's battery. In particular, operational infrastructure can be one or more parts of a ground charging system that is configured to charge batteries of one or more UAVs. Additionally or alternatively, operational infrastructure can be an entire charging system. In some implementations, the present disclosure may extend to operational infrastructure being any structure, device, or equipment that can be deployed in order to establish a short-term or long-term storage space, such as for storing or housing a UAV, one or more parts of a charging system, and/or transport item(s), among others.

In practice, a UAV can deploy operational infrastructure in various ways. In one example, a UAV can carry out a tethered pickup and/or delivery of operational infrastructure. In another example, operational infrastructure can be attached to a top, bottom, and/or side portion of a UAV (e.g., without use of a tether), so that the UAV can transport the attached operational infrastructure. In yet another example, operational infrastructure can be housed within an interior compartment of the UAV, so that the UAV can transport the operational infrastructure. Other examples are also possible.

Figure 5A:
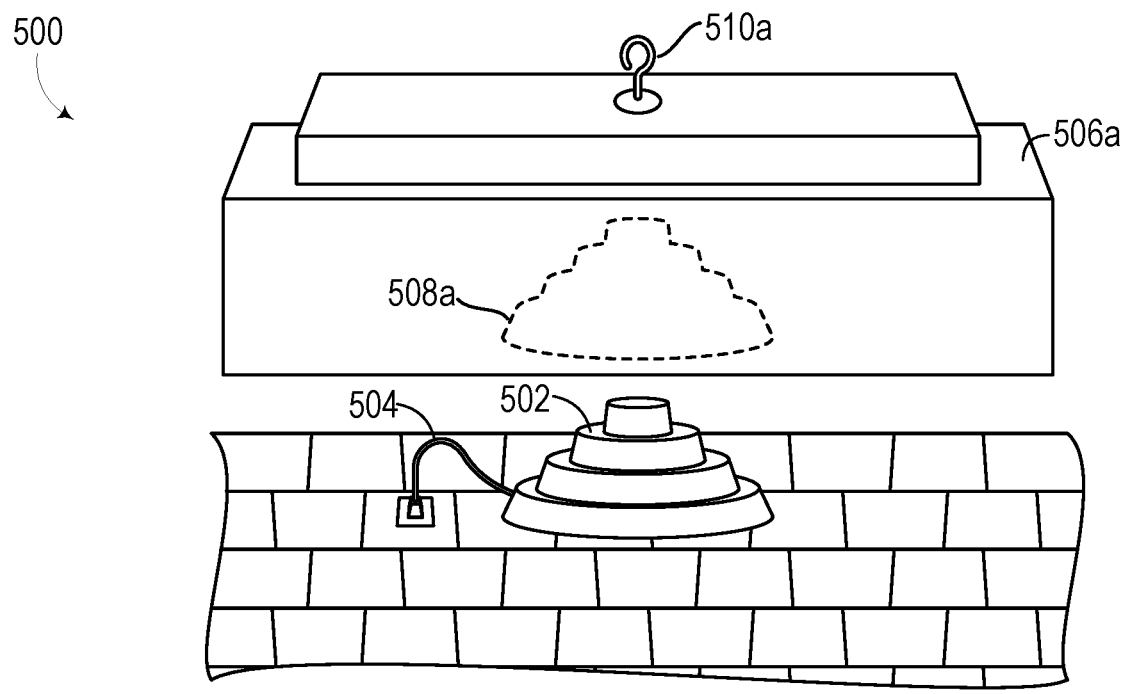
FIGS. 5A to 5B illustrate an adaptable charging system having a charging interface that is deployable by a UAV, according to example embodiments.

FIG. 5A next illustrates an adaptable charging system 500 including operational infrastructure that is deployable by a UAV. Specifically, the system 500 includes a universal power interface 502 having a power cable 504, and also includes a charging interface 506a.

As an initial matter, the universal power interface 502 can be installed (e.g., attached to or otherwise placed) on any feasible structure, such as a roof of a house, as shown, other roofs, or other permanent or semi-permanent structures As part of the process of installing the universal power interface 502, the power cable 504 can be connected to a power supply directly or via another device, such as a power socket for instance, so that the universal power interface 502 can receive electrical power from the power supply via the power cable 504. In practice, installation of the universal power interface 502 can be carried out by an individual, such as a technician for example.

Additionally, charging interface 506a can be arranged to transfer electrical power to a battery of a UAV. In particular, charging interface 506a may include a receptacle 508a having a shape (e.g., a cone and/or pyramid shape) that substantially complements a shape of the universal power interface 502, thereby providing for coupling of the charging interface 506a to the universal power interface 502. Coupling of the charging interface 506a to the universal power interface 502 may enable transfer of electrical power to the charging interface 506a, for example, using electrical equipment in the receptacle 508a configured to receive such power from the universal power interface 502. In turn, this electrical power can then be further transferred from the charging interface 506a to a battery of a UAV that has landed on or nearby the charging interface 506a, and such transfer can be carried out via a wired or a wireless power connection for instance.

Furthermore, charging interface 506a can be coupled to and/or removed from the universal power interface 502 in various ways. For example, the charging interface 506a can include a hook 510a onto which a tether of a UAV can couple. Hook 510a may allow the UAV to pick up the charging interface 506a, aerially transport the charging interface 506a, drop the charging interface 506a onto the universal power interface 502, and/or remove the charging interface 506a from the universal power interface 502, among other options. Other examples are also possible.

Figure 5B:
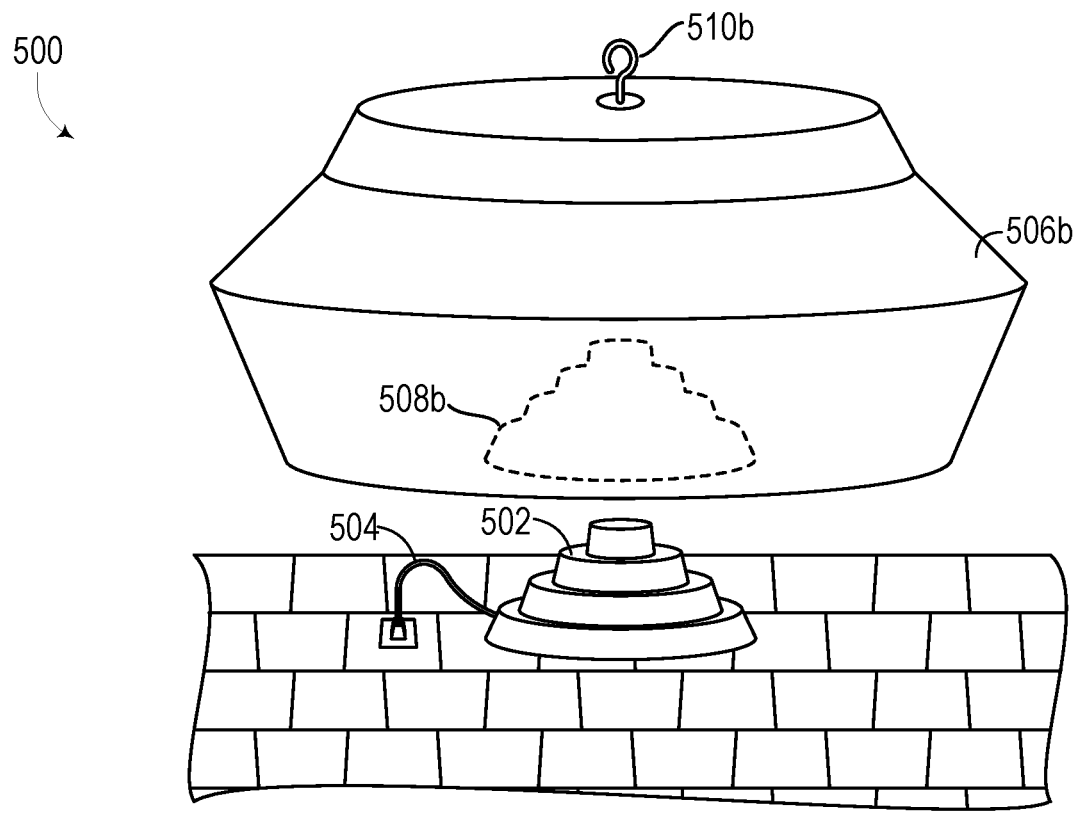

FIG. 5B next illustrates another charging interface 506b that can be deployed onto the same universal power interface 502.

As an initial matter, a next generation charging interface 506b may be similar to the charging interface 506a in various ways. For example, the charging interface 506b may also include a receptacle 508b having a shape (e.g., a cone and/or pyramid shape) that substantially complements a shape of the universal power interface 502, thereby providing for coupling of the charging interface 506a to the universal power interface 502. In another example, the charging interface 506b may also include a hook 510b onto which a tether of a UAV can couple. In yet another example, the charging interface 506b may also include equipment that provide for transfer of electrical power from the universal power interface 502 to a battery of a UAV.

However, the next generation charging interface 506b can also be different from the charging interface 506a in various ways. For example, charging interface 506b can have a weight, shape, and/or size that are different from that of the charging interface 506a. For instance, charging interface 506b can have a weight that is lesser than a weight of charging interface 506a. In another example, the charging interface 506b can use a different approach for transferring electrical power to a battery of a UAV. For instance, the charging interface 506a may be configured to transfer electrical power to a battery of a UAV using a wired connection. Whereas, the charging interface 506b may be configured to wirelessly transfer electrical power to a battery of a UAV. Other examples are also possible.

Accordingly, the above-described arrangement of the adaptable charging system 500 can be advantageous for various reasons. For example, such an arrangement can allow for deployment in a geographic area of a plurality of charging interfaces by one or more UAVs in a self-scaling manner and without the assistance of an individual. In another example, such an arrangement can allow for removal of a given charging interface, so that the given charging interface can undergo maintenance and/or be replaced by another charging interface, such as by an equivalent charging interface or by a "next generation" charging interface. Other examples are also possible.

Figure 6:
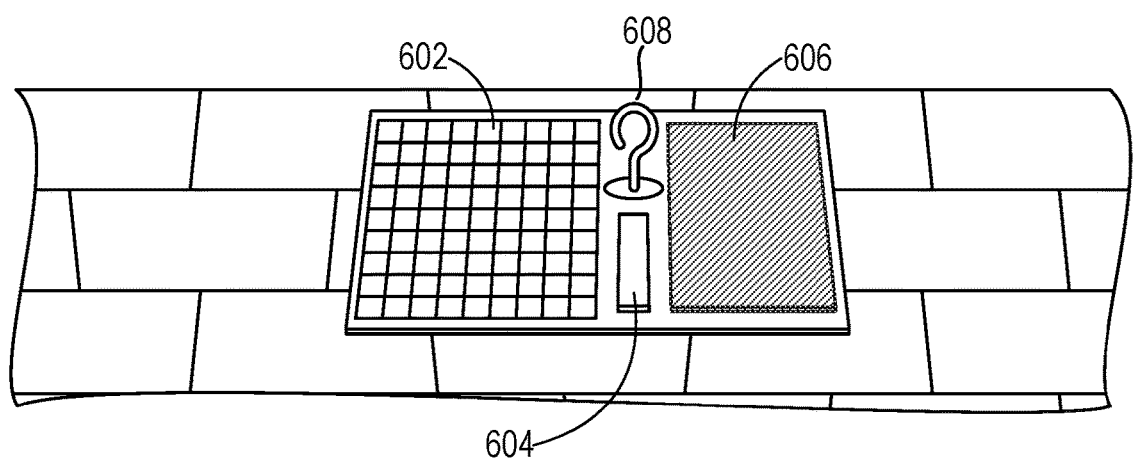
FIG. 6 illustrates a solar charging system that is deployable by a UAV, according to example embodiments.

FIG. 6 next illustrates a solar charging system 600 including operational infrastructure that is deployable by a UAV. More specifically, the system 600 includes a solar panel 602, such as any currently available or future-developed solar panel that is configured to convert sunlight into electrical power. Additionally, the system 600 may include an energy storage device 604 configured to store electrical power generated by the solar panel 602, such as for the purpose of delivering that stored electrical power to a UAV at any feasible time (e.g., nighttime, other times where solar panel 602 has limited or no UV exposure). Further, the system 600 may include a charge pad 606 that may have electrical equipment configured to transfer electrical power from the solar panel 602 and/or the energy storage device 604 to a battery of a UAV that has landed on or nearby the charge pad 606, and such transfer can be carried out via a wired or a wireless power connection for instance.

Moreover, the solar charging system 600 can be arranged for deployment by a UAV. As an initial matter, the system 600 can be relatively lightweight, such as by having a weight that is lesser than a weight of a UAV arranged or otherwise designated to transport the system 600. Additionally, the system 600 can include a hook 608 onto which a tether of a UAV can couple. And this hook 608 may allow the UAV to pick up the system 600, aerially transport the system 600, drop off the system 600 at a given location (e.g., a roof of a house), and/or remove the system 600 from the given location, among other options. Other examples and illustrations are also possible.

In some cases, a next generation solar charging system (not shown) can be developed. The next generation solar charging system may be similar to the solar charging system 600 in various ways. For example, the next generation solar charging system may also include a solar panel, an energy storage device, and a charge pad. However, the next generation solar charging system can also be different from the solar charging system 600 in various ways. For example, the next generation solar charging system can have a weight, shape, and/or size that are different from that of the solar charging system 600. For instance, the next generation solar charging system can have a weight that is lesser than a weight of solar charging system 600. Other examples are also possible.

Accordingly, any existing operational infrastructure that is deployable by a UAV in accordance with the present disclosure could be updated over time through development of a next generation operational infrastructure that is also deployable by a UAV. The next generation operational infrastructure can be different from the existing operational infrastructure in any feasible manner, such as in any of the ways described herein, for instance. As such, by way of example, existing operational infrastructure can be replaced at any feasible time by other operational infrastructure, such as by equivalent operational infrastructure or by a "next generation" operational infrastructure. Other examples are also possible.

VII. DETERMINING OPERATIONAL LOCATION(S) FOR UAV(S)

Generally, an operational location may be a location within a geographic area at which operational infrastructure can be deployed. For example, an operational location may be a location at which a UAV nest (e.g., UAV nest 404a) has been set up or will be set up. Additionally or alternatively, an operational location may be a location other than a location of a UAV nest, such as a roof of a house, or other building or structure, in the geographic area, among other options. In either case, an operational location can be a location at which a UAV can charge the UAV's battery after operational infrastructure has been deployed, and perhaps also one from which a UAV can carry out a UAV transport task, which may include pickup of an item at an item-source location (can also be referred to herein as a pickup location) and subsequent delivery of the item at a delivery location.

In accordance with the present disclosure, a control system (e.g., ATSP 402) can determine one or more operational locations in various ways.

In one example, the operational locations can be locations that have been permitted for use as operational locations. In particular, the control system can determine a plurality of authorized locations at which respective deployment of operational infrastructure is permitted. When the control system determines operational location(s), the control system may determine the operational location(s) based on each operational location being one of the determined authorized locations.

In another example, the control system may determine operational location(s) in accordance with respective flight ranges of UAV(s). In particular, the control system can determine a flight range respectively of one or more UAVs from a group, and can then determine the operational location(s) based on the determined flight range(s). For instance, the control system can determine an operational location for a UAV, so that a distance between a source location of the UAV, which is further described herein, and the operational location is less than a determined flight range of the UAV. In another instance, the control system can determine an operational location for a UAV, so that a round trip distance between the operational location and a common item pickup/delivery location (e.g., a third-party entity) is less than a determined flight range of the UAV. As such, consideration of a UAV's flight range when determining an operational location for a UAV can possibly allow the UAV to carry out an item transport task from the operational location without fully depleting the UAV's battery.

In yet another example, the control system may determine operational location(s) in accordance with demand for aerial transport services of a group of UAVs in a geographic area. In particular, the control system can determine current and/or expected demand for the aerial transport services, and can do so in various ways. For instance, the control system can determine or estimate demand in various sub areas of the geographic area based on locations of third-party entities that have accounts with a UAV transport service provider, based on population density at those sub areas, based on historical information representative of previous item transport tasks carried out by UAVs, and/or based on requested and yet to be completed item transport tasks, among other options. Once the control system determines demand for the aerial transport services, the control system may then determine operational location(s) that would enable a group of UAVs to meet that determined demand.

In this regard, determination of operational location based on demand can occur dynamically, so that operational infrastructure can be dynamically redeployed from sub area(s) having relatively low demand to sub area(s) that have relatively high demand. Consequently, aerial transport services can be provided in a self-scaling manner and without under-utilization of operational infrastructure.

Accordingly, when the control system determines operational location(s), the control system can do so based on one or more of the described factors, among others. And the control system can be configured to use machine learning or other techniques to improve over time the approach for determining operational location(s).

By way of example, after certain operational location(s) are determined and UAV(s) carry out transport task(s) from these operational location(s), the control system can determine performance of those operational location(s), such as based on time and/or energy spent by UAV(s) to pick up and/or deliver item(s) when operating from these operational location(s), among other options. And this determined performance can be fed back as training data to a machine learning process, so that the machine learning process can help determine improved operational locations in the future, such as those that allow UAV(s) to spend less time and/or energy to pick up and/or deliver item(s). Other examples are also possible.

Furthermore, in some cases, each operational location in a geographic area may respectively have an associated sub area of the geographic area. For instance, this may be the case if an operational location is a location of a UAV nest in line with the discussion above.

In particular, a given operational location may be one from which one or more UAVs of a group may provide aerial transport services in a sub area of the geographic area at issue. Such a sub area can be defined in various ways and can take on any feasible shape and form. By way of example, a given sub area may include a plurality of locations in the geographic area that are each respectively within a threshold distance away from the given operational location. In practice, this threshold distance can be, for instance, half of a flight range of a UAV that provides aerial transport services from the given operational location, which can possibly allow at least that UAV to carry out an item transport task in the given sub area from the given operational location without fully depleting the UAV's battery. In this manner, UAV(s) can be assigned to an operational location, so that these UAV(s) are dedicated to carry out transport tasks in the sub area for at least some time period. Other examples are also possible.

Yet further, in some cases, UAV(s) may fly from a source location respectively to their assigned operational location(s). For instance, a group of UAVs may initially be in a source structure that has been temporarily or permanently placed in the geographic area at a select source location. By way of example, the source structure may be a container configured to house the group of UAVs and perhaps also operational infrastructure, among other options. And this container may be temporarily or permanently placed (e.g., after being transported by a truck) at a substantially central location in the geographic area, which may be considered as the source location at issue. In other examples, the source structure may be a distributor or retailer warehouse or a restaurant, among various other options.

In any case, as further discussed herein, one or more UAV(s) of the group can each respectively fly from a source location to an assigned operational location at various times. For example, in line with the present disclosure, a given UAV can fly from the source location to its assigned operational location as part of an infrastructure deployment task that also includes installation of operational infrastructure at the assigned operational location by the given UAV. In another example, in line with the present disclosure, a given UAV can fly from the source location to its assigned operational location after operational infrastructure has already been installed at the assigned operational location by that given UAV or by another UAV. Other examples are possible as well.

Figure 7:
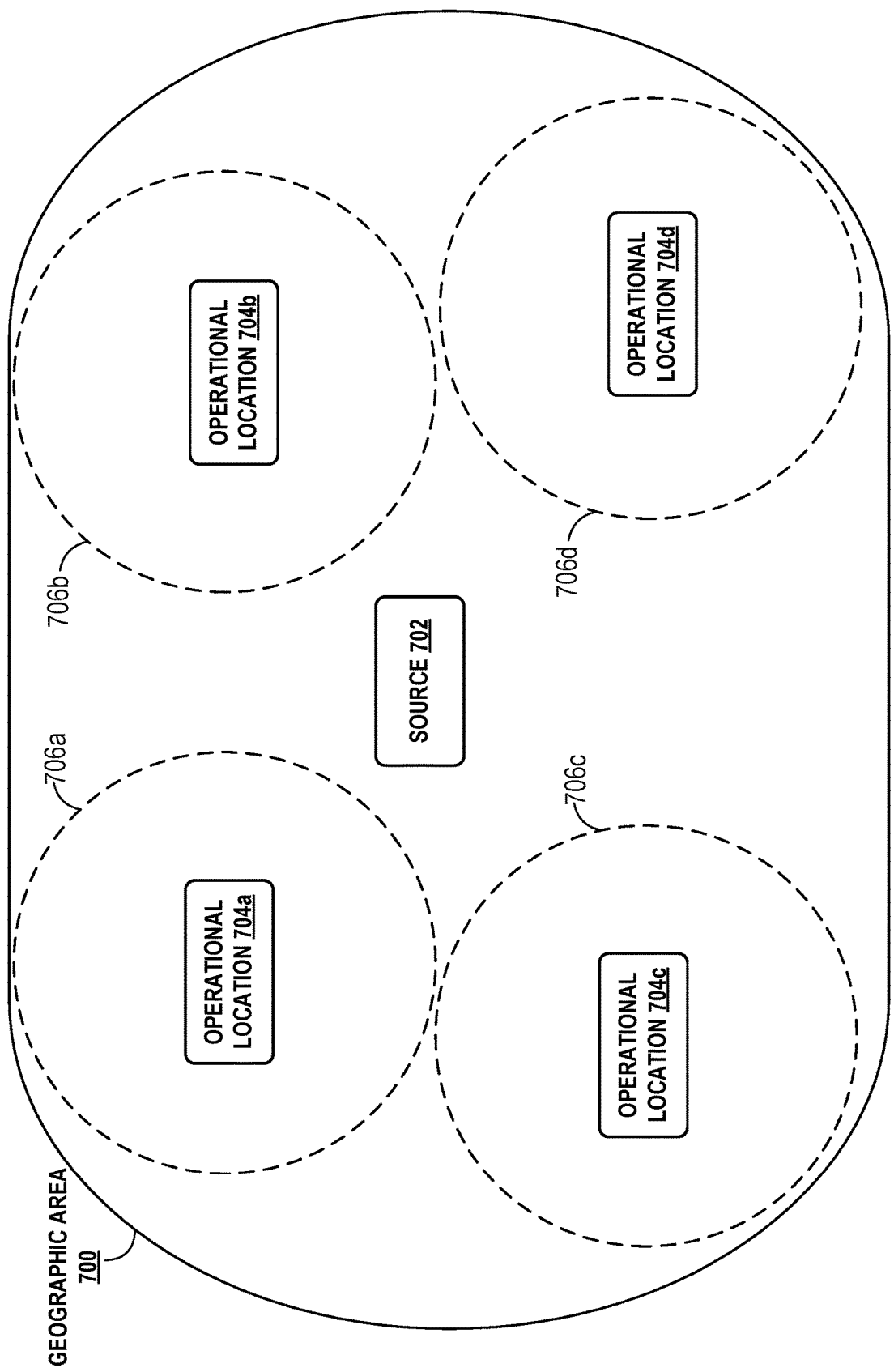
FIG. 7 illustrates a geographic area including a plurality of operational locations, according to example embodiments.

FIG. 7 next illustrates a representative geographic area 700 at which a group of UAVs can provide aerial transport services. As shown, the geographic area 700 includes a source location 702 that serves as a location from which one or more UAVs of the group respectively fly to operational locations 704*a* to 704*d*. In some examples, source location 702 may be substantially centrally located. Moreover, each of the operational locations 704a to 704d respectively have associated sub areas 706a to 706d, so that UAV(s) at a given one of the operational location (e.g., operational location 704a) can be at least temporarily dedicated to carrying out aerial transport tasks at the associated sub area (e.g., sub area 706a). Other illustrations are possible as well.

VIII. USE OF UAV(S) DEDICATED TO DEPLOYMENT OF OPERATIONAL INFRASTRUCTURE

Figure 8:
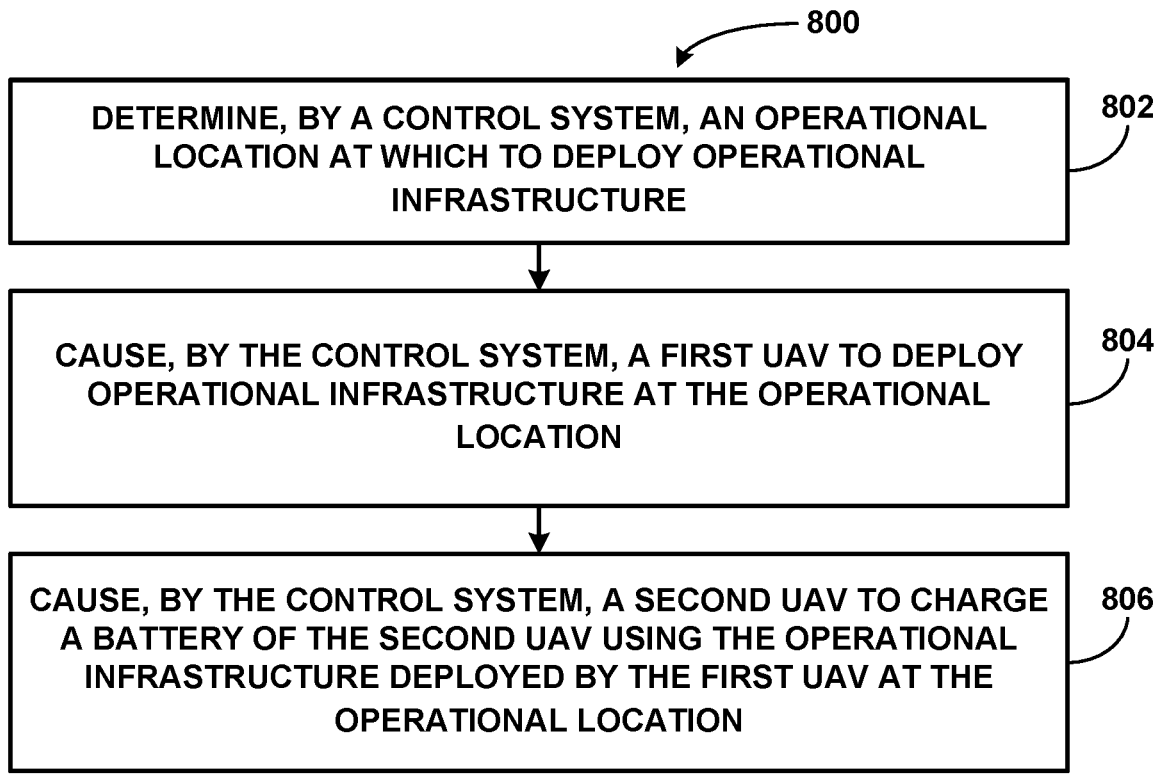
FIG. 8 is a flowchart of a method for using a UAV dedicated to deployment of operational infrastructure, according to example embodiments.

FIG. 8 is a flowchart illustrating a method 800, which relates to using a UAV dedicated to deployment of operational infrastructure.

Method 800 shown in FIG. 8 (and other processes and methods disclosed herein) presents a method that can be implemented within an arrangement involving, for example, any of the systems shown in FIGS. 1A to 6 (or more particularly by one or more components or subsystems thereof, such as by a processor and a non-transitory computer-readable medium having instructions that are executable to cause the device to perform functions described herein), among other possible systems.

Method 800 and other processes and methods disclosed herein may include one or more operations, functions, or actions, as illustrated by one or more of blocks 802-806 for instance. Although blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 800 and other processes and methods disclosed herein, the flowchart shows functionality and operation of one possible implementation of the present disclosure. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 800 and other processes and methods disclosed herein, each block in FIG. 8 may represent circuitry that is wired to perform the specific logical functions in the process.

At block 802, method 800 may involve determining, by a control system, an operational location at which to deploy operational infrastructure.

As an initial matter, the control system at issue may be on-board a UAV and/or may be an external control system that transmits instructions to UAV(s) (e.g., ATSP 402), among other options. Additionally, the control system can use any of the techniques described herein to determine the operational location at which to deploy operational infrastructure. And as discussed, deployment of operational infrastructure may enable charging of a battery of one or more UAVs from a group of UAVs.

In practice, the group of UAVs may be any group that includes at least some UAVs capable of carrying out transport tasks that involve transport of item(s). In one case, the group of UAVs may belong to an entity that provides items to be transported by one or more UAVs of the group and/or that interfaces with the recipients who request delivery of these items. In another case, the group of UAVs may belong to a UAV transport service provider, which may be a separate entity from the entity that provides the items being transported and/or that interfaces with the recipients who request delivery of these items. Other cases are also possible.

In any case, the group at issue may include at least (i) a first UAV of a first type that is arranged to deploy operational infrastructure and (ii) a second UAV of a second type that is arranged to carry out tasks other than deployment of operational infrastructure.

In the context of method 800, the first type of UAV may include features that enable a UAV of the first type to deploy operational infrastructure at operational location(s) within a geographic area. And the second type of UAV may include features that enable a UAV of the second type to carry out tasks other than deployment of operational infrastructure, such as transport tasks that include pickup and delivery of items other than operational infrastructure.

For example, a UAV of the first type may include a tether system having a motor that is configured to operate at parameters (e.g., apply torque(s), force(s), and/or motor speed(s)) that enable the tether system to lift operational infrastructure off the ground and/or lower operational infrastructure to the ground. Whereas, a UAV of the second type may include a tether system having a motor that is configured to operate at parameters that enable the tether system to lift and/or lower payload(s) having a weight up to a particular weight, which may be a weight that is lesser than a weight of the operational infrastructure (e.g., a weight of charging interface 506a and/or a weight of solar charging system 600). In practice, this particular weight can be a weight that meets regulations for UAVs permitted to carry out transport tasks, such as regulations set by the Federal Aviation Administration (FAA), for instance.

In another example, a UAV of the first type may include a propulsion unit that enables the UAV to transport the operational infrastructure at issue. Whereas, a UAV of the second type may include a propulsion unit that enables the UAV to transport payload(s) having a weight up to a particular weight, which, here again, may be a weight that is lesser than a weight of the operational infrastructure.

In yet another example, a UAV of the first type may include a transport system, such as a tether system for instance, that enables the UAV to transport payload(s) having a size up to a first size. This first size may be greater than a size of the operational infrastructure at issue (e.g., a size of charging interface 506a), thereby allowing the UAV of the first type to transport this operational infrastructure. Whereas, a UAV of the second type may include a transport system, such as an internal compartment for instance, that enables the UAV to transport payload(s) having a size up to a second size, which may be lesser than a size of the operational infrastructure at issue, thereby preventing the UAV of the second type from transporting this operational infrastructure. Various other examples are also possible.

At block 804, method 800 may involve causing, by the control system, the first UAV to deploy operational infrastructure at the operational location.

Once the control system determines one or more operational locations, the control system may instruct one or more UAVs of the first type (e.g., the first UAV) to each respectively carry out an infrastructure deployment task. This infrastructure deployment task may include a flight to a determined operational location, such as from a source location in line with the discussion above. Also, the infrastructure deployment task may include installation of operational infrastructure at the determined operational location.

Generally, a UAV of the first type can be instructed to carry out an infrastructure deployment task at one or more of various possible times.

In one case, the control system can instruct a UAV of the first type to deploy operational infrastructure at a determined operational location before a UAV of the second type has arrived at this operational location and/or began carrying out transport tasks from this operational location. For example, an ATSP's first mission each day can involve causing one or more UAVs of the first type to deploy operational infrastructure at one or more operational locations in a geographic area.

In another case, however, the control system can instruct a UAV of the first type to deploy operational infrastructure at a determined operational location after a UAV of the second type has arrived at this operational location and/or began carrying out transport tasks from this operational location. For example, while an ATSP is providing aerial transport services in a geographic area, the ATSP may determine that a particular sub area of geographic area has an insufficient number of charging interfaces (e.g., based on demand in the particular sub area), and may responsively instruct one or more UAVs of the first type to deploy several charging interfaces at several operational locations in the particular sub area, so as to increase the number of charging interfaces in the sub area to a sufficient number. Other cases and examples are also possible.

Figure 9A:
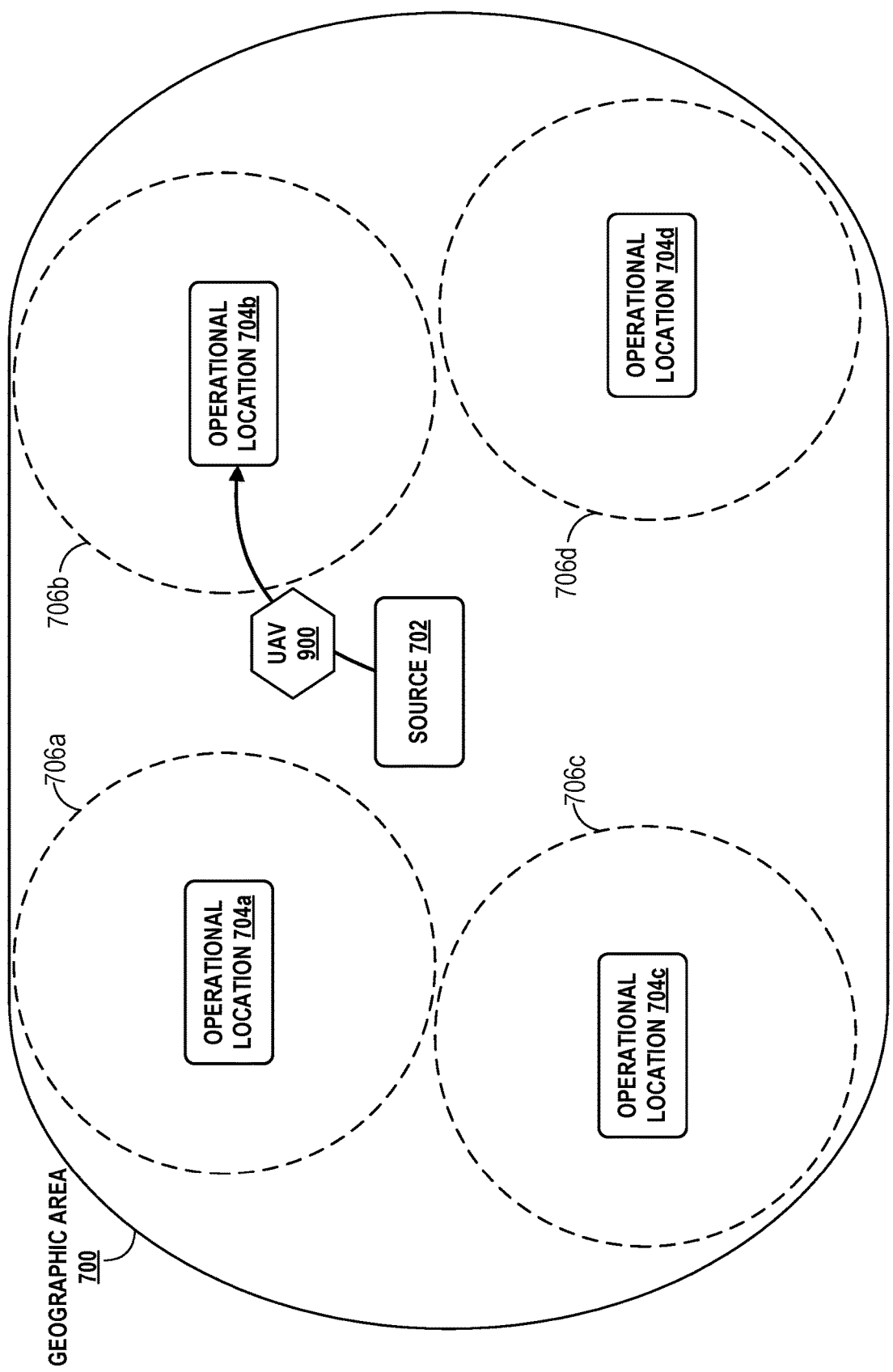
FIGS. 9A to 9D illustrate use of a dedicated UAV to deploy operational infrastructure and subsequent use of the deployed operational infrastructure to charge batteries of another UAV, according to example embodiments.
Figure 9B:
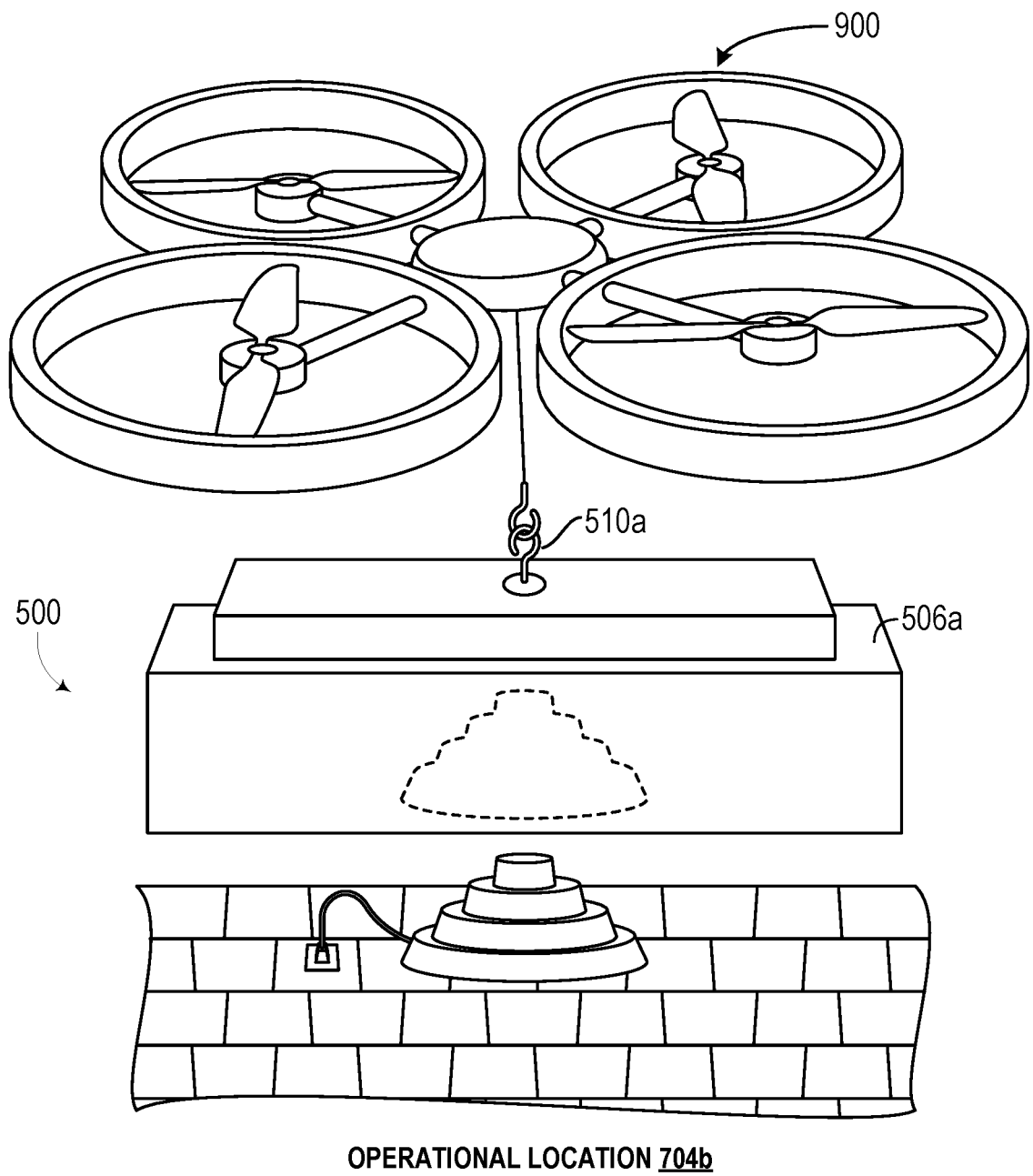

FIGS. 9A to 9B next illustrate deployment of operational infrastructure in the geographic area 700 by a UAV 900 of the first type.

In particular, as shown in FIG. 9A, the UAV 900 may fly from the source location 702 to the operational location 704b and, in doing so, may transport operational infrastructure, such as charging interface 506a for example. And as shown in FIG. 9B, once the UAV 900 arrives at the operational location 704b (e.g., a roof of a particular house), the UAV 900 may deploy the charging interface 506a onto the universal power interface 502, so that the charging interface 506a couples to the universal power interface 502 in line with the discussion above.

To do so, the UAV 900 may lower a tether of the UAV 900 that is coupled to the hook 510a of the charging interface 506a, so as to cause the charging interface 506a to lower towards the universal power interface 502 while the UAV 900 hovers substantially above universal power interface 502. And once the that the charging interface 506a couples to the universal power interface 502 in line with the discussion above, the UAV 900 may cause the tether to decouple from the hook 510a of the charging interface 506a, thereby completing deployment of the charging interface 506a at the operational location 704b (not shown). Other illustrations are also possible.

At block 806, method 800 may involve causing, by the control system, the second UAV to charge a battery of the second UAV using the operational infrastructure deployed by the first UAV at the operational location.

Once operational infrastructure has been deployed at one or more operational locations in a geographic area, the control system may instruct one or more UAVs of the second type (e.g., the second UAV) to each respectively use the deployed operational infrastructure to charge their respective batteries. For example, the control system may instruct the second UAV of the second type to charge a battery of the second UAV using the operational infrastructure deployed by the first UAV at the determined operational location. Additionally, the control system may instruct another UAV of the second type to charge its battery using operational infrastructure deployed by the first UAV or by another UAV of the first type at a different operational location, and so on.

Generally, a UAV of the second type can be instructed to charge its battery at one or more of various possible times. For example, following the above-described first mission, an ATSP's second mission each day can involve causing one or more UAVs of the second type to respectively fly to their assigned operational locations, and to then charge their respective batteries using operational infrastructure that has been respectively deployed at those assigned operational locations. In another example, a UAV of the second type can be instructed to charge its battery on an as-needed basis, such as when the control system determines that a battery level is below a threshold battery level, for instance. Other examples are also possible.

Moreover, in line with the discussion above, a UAV of the second type can carry out transport task from an operational location at which operational infrastructure has been deployed or is to be deployed. For instance, the control system can receive a request for a transport task that has an associated item-source location (e.g., a pickup location at which an item should be picked up). And the control system can determine that the item-source location corresponds to the operational location at which the second UAV of the second type has been instructed to charge its battery. For example, the control system can do so by determining that the item-source location is in a sub area that is associated with the operational location at issue in line with the discussion above. In any case, once the control system determines that the item-source location corresponds to the operational location at issue, the control system may cause the second UAV to perform the requested transport task, such by at least instructing the second UAV to pick up the item at the item-source location, and possibly also instructing the second UAV to deliver the item at a delivery location associated with the request.

Figure 9C:
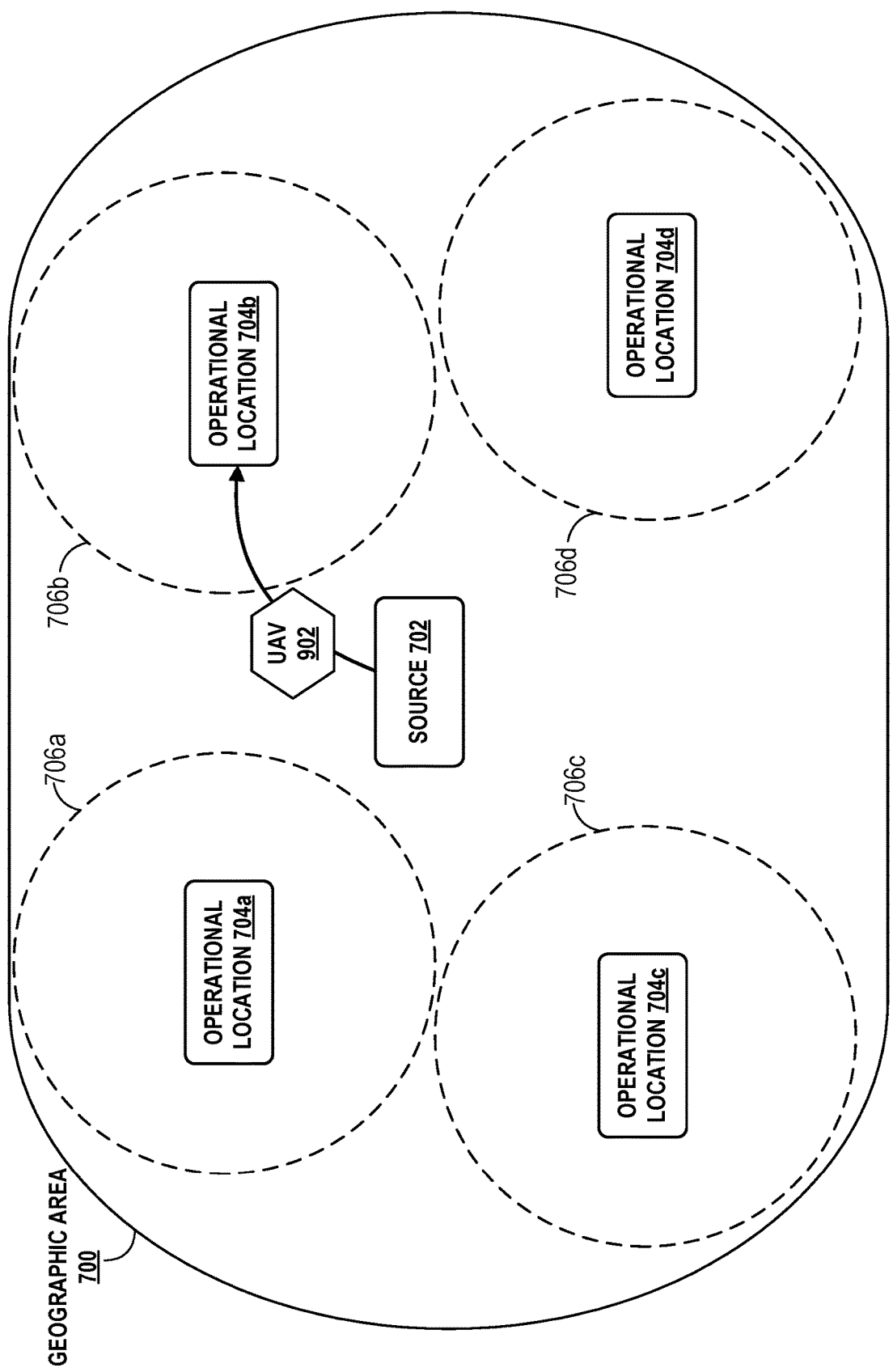
Figure 9D:
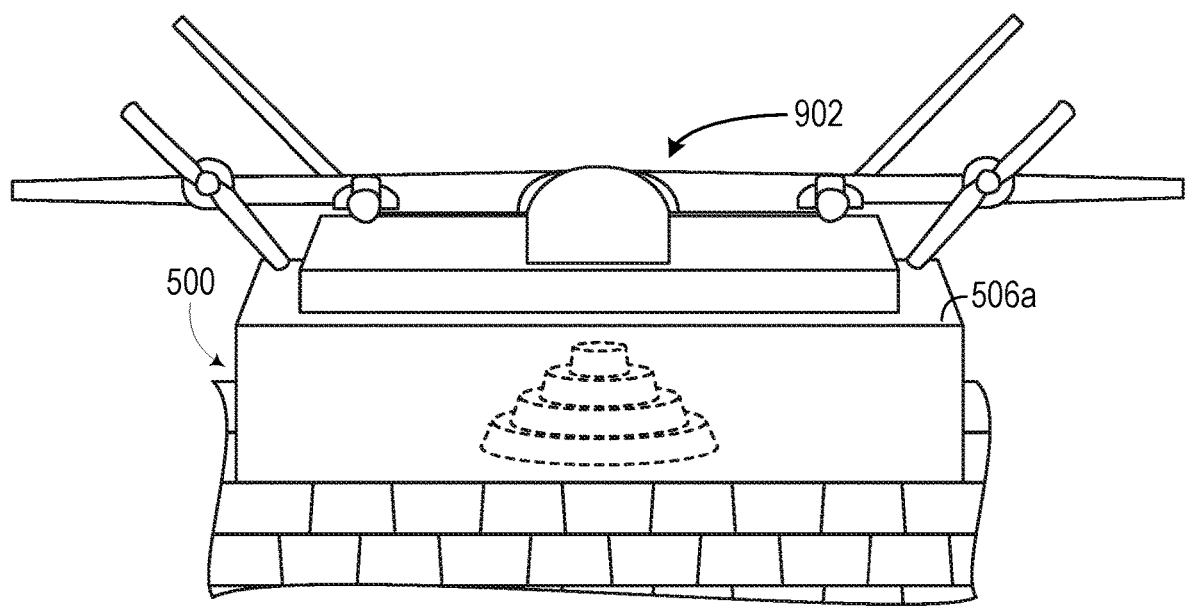

FIGS. 9C to 9D next illustrate a UAV 902 of the second type on a mission that includes charging its battery at the operational location 704b. In particular, as shown in FIG. 9C, the UAV 902 may carry out a flight from the source location 702 to the operational location 704b, which can be the UAV 902's first flight on a given day for example. Once the UAV 902 arrives at the operational location 704b, the UAV 902 may charge a battery of the UAV 902 using operational infrastructure that has been deployed by UAV 900 at the operational location 704b. For example, as shown in FIG. 9D, the UAV 902 may land on the charging interface 506a that has been by UAV 900 at the operational location 704b, and may then receive electrical power from the charging interface 506a, so as to charge the battery. Moreover, after the UAV 902 charges its battery at the operational location 704b, the UAV 902 can then carry out transport task(s) in the associated sub area 706b. Other illustrations are also possible.

Given an implementation in which a group of UAVs includes one or more UAVs of the first type, operational infrastructure can be added, removed, and/or moved at any feasible time and for any feasible reason. For instance, operational infrastructure can be added, removed, and/or moved as part of the above-described first mission and/or after the first mission. Such addition, removal, and/or movement of operational infrastructure can be based on demand for aerial service of the group and/or based on a determined need for operational infrastructure in a geographic area, among other options.

Furthermore, any given UAV of the first type in the group can carry out addition, removal, and/or movement of operational infrastructure.

In one case, the same UAV of the first type can deploy operational infrastructure at several operational locations. For example, the first UAV of the first type may deploy first operational infrastructure at a first determined operational location. Subsequently, that same first UAV of the first type may deploy second operational infrastructure at a second determined operational location.

In another case, different UAVs of the first type can respectively deploy operational infrastructure at different operational locations. For example, the first UAV of the first type may deploy first operational infrastructure at a first determined operational location. Subsequently, a third UAV of the first type may deploy second operational infrastructure at a second determined operational location.

In yet another case, a UAV of the first type that deployed operational infrastructure at a given operational location can be the same one that also removes that operational infrastructure from the given operational location. For example, the first UAV of the first type may deploy first operational infrastructure at a first determined operational location. Subsequently, that same first UAV of the first type may remove that first operational infrastructure from the first determined operational location.

In yet another case, a UAV of the first type that deployed operational infrastructure at a given operational location can be different from the one that removes that operational infrastructure from the given operational location. For example, the first UAV of the first type may deploy first operational infrastructure at a first determined operational location. Subsequently, a third UAV of the first type may remove that first operational infrastructure from the first determined operational location.

In yet another case, a UAV of the first type that deployed operational infrastructure at a given operational location can be the same one that also moves this operational infrastructure from the given operational location to another operational location. For example, the first UAV of the first type may deploy first operational infrastructure at a first determined operational location. Subsequently, the first UAV of the first type may move the first operational infrastructure from the first determined operational location to a second determined operational location.

In practice, this second operational location can be in the same geographic area as the first operational location. In this situation, second operational location can be in the same sub area as the first operational location or can be at a sub area that is different from the sub area of the first operational location. In another situation, however, the second operational location can be in a geographic area that is altogether different from the geographic area of the first operational location (e.g., the first and second operational locations can be in different neighborhoods of the same city).

In yet another case, a UAV of the first type that deployed operational infrastructure at a given operational location can be different from the one that moves this operational infrastructure from the given operational location to another operational location. For example, the first UAV of the first type may deploy first operational infrastructure at a first determined operational location. Subsequently, a third UAV of the first type may move the first operational infrastructure from the first determined operational location to a second determined operational location.

Here again, the second operational location can be in the same geographic area as the first operational location. In this situation, second operational location can be in the same sub area as the first operational location or can be at a sub area that is different from the sub area of the first operational location. In another situation, however, the second operational location can be in a geographic area that is altogether different from the geographic area of the first operational location. Other cases and examples are possible as well.

IX. SELF-DEPLOYMENT OF OPERATIONAL INFRASTRUCTURE FOR A UAV

Figure 10:
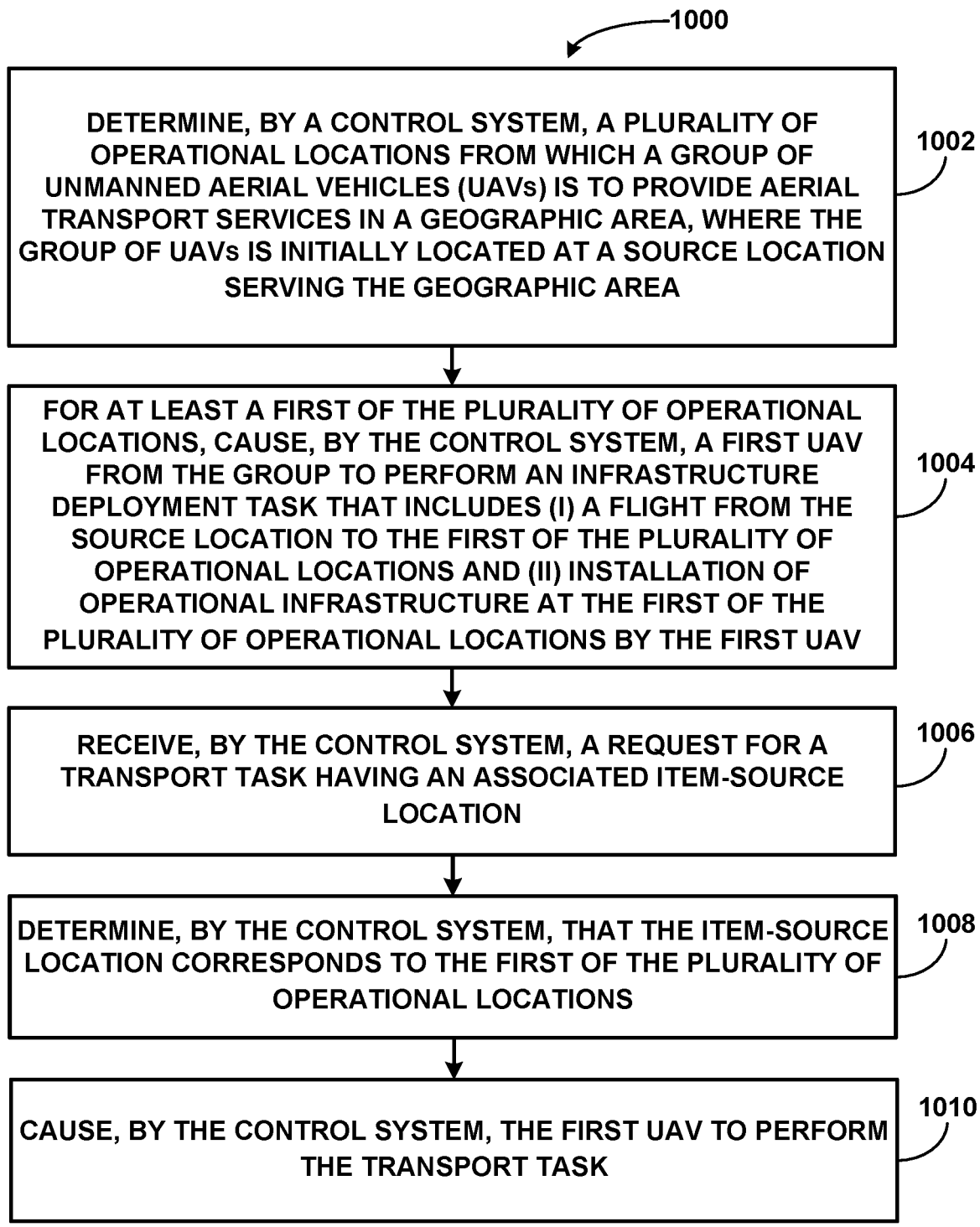
FIG. 10 is a flowchart of a method for self-deployment of operational infrastructure for a UAV, according to example embodiments.

FIG. 10 is a flowchart illustrating a method 1000, which relates to self-deployment of operational infrastructure for a UAV. Namely, method 1000 relates to using the same UAV both for carrying out transport task(s) and for deployment of operational infrastructure, which can in turn be used by that UAV for charging that UAV's battery.

Method 1000 shown in FIG. 10 (and other processes and methods disclosed herein) presents a method that can be implemented within an arrangement involving, for example, any of the systems shown in FIGS. 1A to 6 (or more particularly by one or more components or subsystems thereof, such as by a processor and a non-transitory computer-readable medium having instructions that are executable to cause the device to perform functions described herein), among other possible systems.

Method 1000 and other processes and methods disclosed herein may include one or more operations, functions, or actions, as illustrated by one or more of blocks 1002-1010 for instance. Although blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 1000 and other processes and methods disclosed herein, the flowchart shows functionality and operation of one possible implementation of the present disclosure. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 1000 and other processes and methods disclosed herein, each block in FIG. 10 may represent circuitry that is wired to perform the specific logical functions in the process.

At block 1002, method 1000 may involve determining, by a control system, a plurality of operational locations from which a group of UAVs is to provide aerial transport services in a geographic area.

As an initial matter, the control system at issue may be on-board a UAV and/or may be an external control system that transmits instructions to UAV(s) (e.g., ATSP 402), among other options. Additionally, the control system can use any of the techniques described herein to determine operational locations at which to deploy operational infrastructure and from which a group of UAVs is to provide aerial transport services. And as discussed, deployment of operational infrastructure may enable charging of batteries of one or more UAVs from the group. Yet further, as discussed, one or more of this group of UAVs may be located initially on or in a source structure that has been temporarily or permanently placed at a source location in the geographic area.

In one case, the group of UAVs may belong to an entity that provides items to be transported by one or more UAVs of the group and/or that interfaces with the recipients who request delivery of these items. In another case, the group of UAVs may belong to a UAV transport service provider, which may be a separate entity from the entity that provides the items being transported and/or that interfaces with the recipients who request delivery of these items. Other cases are also possible.

Although the group of UAVs at issue may or may not include UAV(s) dedicated to deployment of operational infrastructure (e.g., as discussed in association with method 800) and/or other types of UAV(s), method 1000 is generally described in the context of the group including one or more UAVs each respectively arranged both to deploy operational infrastructure and to carry out transport task(s). And for sake of simplicity, the discussion of method 1000 may refer to each such UAV as a "dual-mode" UAV.

More specifically, a dual-mode UAV may include features that enable the dual-mode UAV to deploy operational infrastructure at operational location(s) within a geographic area. Additionally, the dual-mode UAV may include features that enable the dual-mode UAV to carry out tasks other than deployment of operational infrastructure, such as transport tasks that include pickup and/or delivery of items other than operational infrastructure.

By way of example, the dual-mode UAV may include a tether system having a motor that is configured to operate at parameters (e.g., apply torque(s), force(s), and/or motor speed(s)) that enable the tether system to lift and/or lower payload(s) having a weight up to a particular weight. In this example, this particular weight can be a weight that meets regulations for UAVs permitted to carry out transport tasks, which in turn would allow the dual-mode to carry out transport tasks. Also, this particular weight may be greater than a weight of "lightweight" or other operational infrastructure, thereby allowing the dual-mode UAV to also lift this lightweight or other operational infrastructure off the ground and/or lower this lightweight or other operational infrastructure to the ground.

In another example, the dual-mode UAV may include a propulsion unit that enables the dual-mode UAV to transport payload(s) having a weight up to a particular weight. Here again, this particular weight can be a weight that meets regulations for UAVs permitted to carry out transport tasks, which in turn would allow the dual-mode to carry out transport tasks. Also, this particular weight may be greater than a weight of lightweight or other operational infrastructure, thereby allowing the dual-mode UAV to also lift this lightweight or other operational infrastructure off the ground and/or lower this lightweight or other operational infrastructure to the ground.

In yet another example, the dual-mode UAV may be of a weight that is greater than a weight of a payload it is arranged or otherwise designated to lift, lower, and/or transport. In some cases, this payload can be the operational infrastructure that the dual-mode UAV is arranged to deploy, which, here again, may be lightweight or other operational infrastructure. And in other cases, this payload can be one or more items that the dual-mode UAV is arranged to pick up and/or deliver as part of a transport task. In any case, such an arrangement of the dual-mode UAV may increase the likelihood that the dual-mode UAV can successfully lift, lower, and/or transport a payload, such as operational infrastructure, without the weight of this payload preventing the dual-mode UAV from doing so. Other examples are possible as well.

Generally, although the operational infrastructure that the dual-mode UAV is arranged or otherwise designated to deploy does not necessarily have to be lightweight operational infrastructure, method 1000 is described in the context of the dual-mode UAV being arranged or otherwise designated to deploy lightweight operational infrastructure. One example of such lightweight operational infrastructure may be the above-described solar charging system 600, which can be relatively lightweight as noted above. And another example of such lightweight operational infrastructure may be the above-described next generation charging interface 506b, which can have a weight that is lesser than a weight of charging interface 506a as noted above. Other examples are also possible.

At block 1004, method 1000 may involve, for at least a first of the plurality of operational locations, causing, by the control system, a first UAV from the group to perform an infrastructure deployment task that includes (i) a flight from the source location to the first of the plurality of operational locations and (ii) installation of operational infrastructure at the first of the plurality of operational locations by the first UAV.

Once the control system determines a plurality of operational locations, the control system may instruct one or more dual-mode UAVs to each respectively carry out an infrastructure deployment task. Generally, this infrastructure deployment task may include a flight to a determined operational location as well as installation of operational infrastructure at the determined operational location.

Moreover, the flight at issue may be a flight from a source structure at which the one or more dual-mode UAVs are initially located. For example, an ATSP can begin providing aerial transport services in a geographic area by causing one or more dual-mode UAVs to each respectively fly from the source structure to an operational location in the geographic area, so as to install operational infrastructure at those operational location(s). Other examples are also possible.

When a dual-mode UAV installs operational infrastructure at an operational location, this installation may enable the dual-mode UAV to use the installed operational infrastructure to charge a battery of the dual-mode UAV. In this manner, the dual-mode UAV can carry out transport task(s) from this operational location while not having to rely on operational infrastructure installed at other location(s) for the purpose of charging its battery. Other advantages are possible as well.

Figure 11A:
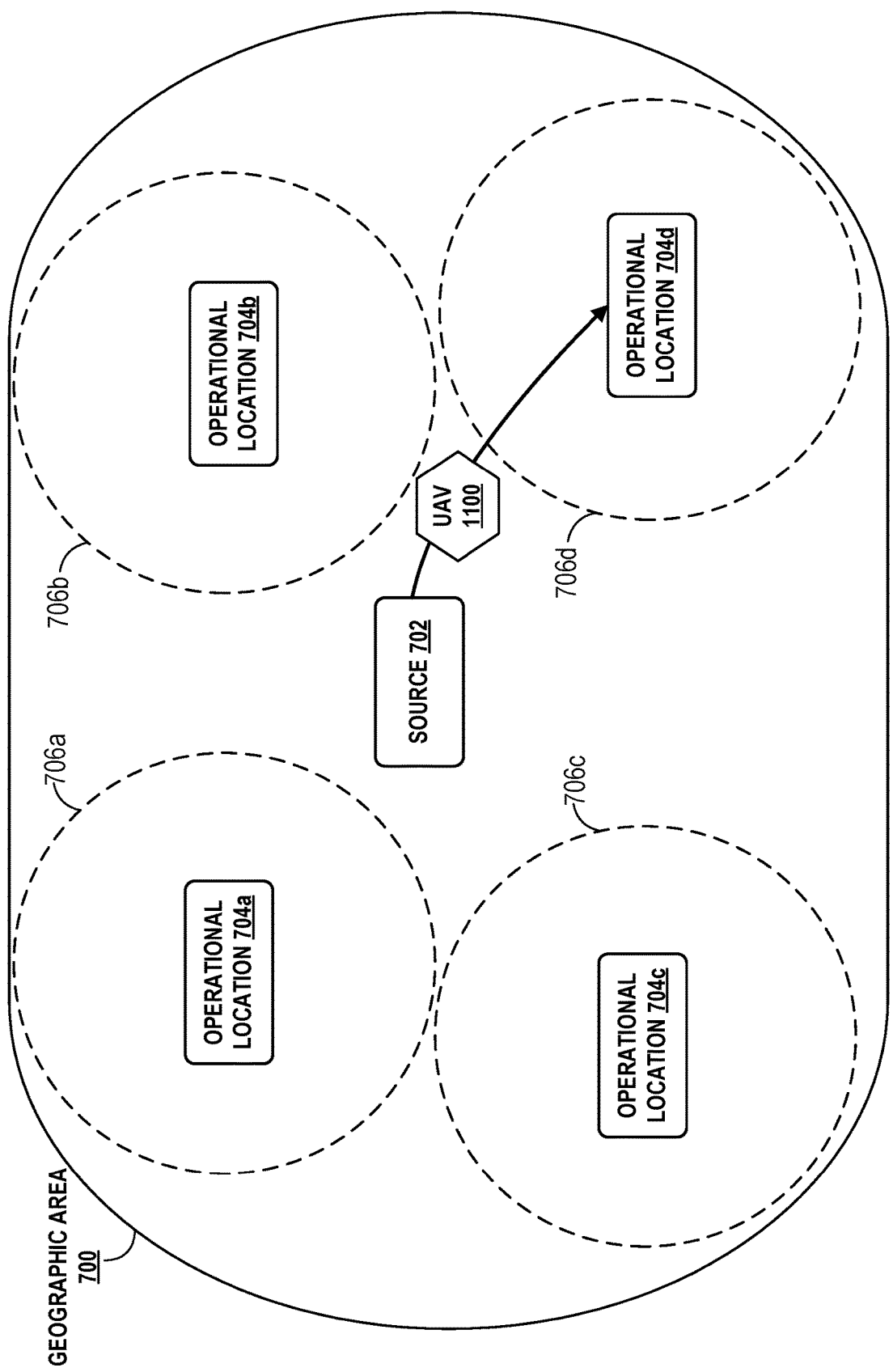
FIGS. 11A to 11D illustrate use of a given UAV to deploy operational infrastructure and subsequent use of the deployed operational infrastructure to charge batteries of the same given UAV, according to example embodiments.
Figure 11B:
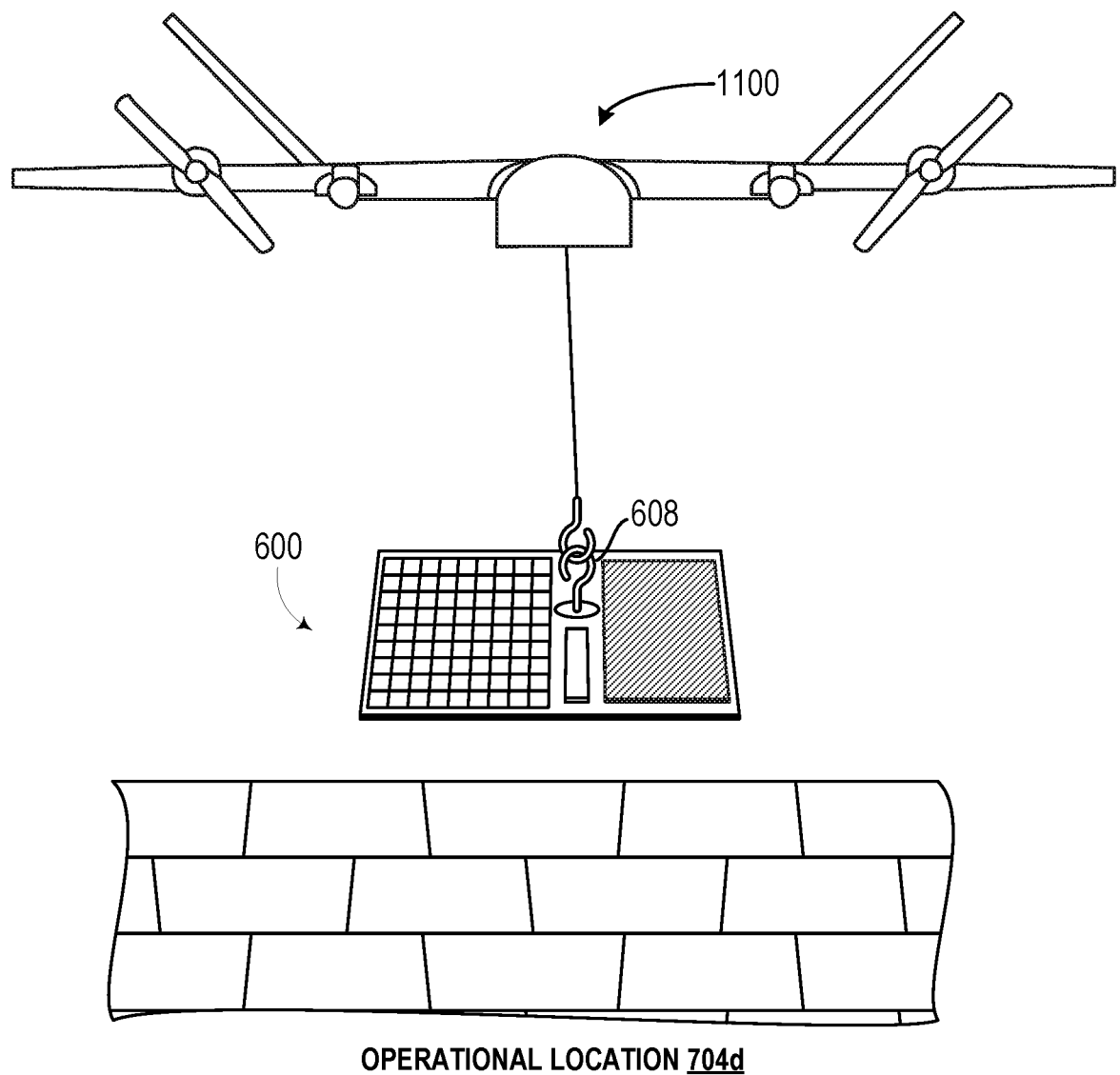

FIGS. 11A to 11B next illustrate self-deployment of operational infrastructure in the geographic area 700 by a dual-mode UAV 1100.

In particular, as shown in FIG. 11A, the dual-mode UAV 1100 may fly from the source location 702 to the operational location 704*d* and, in doing so, may transport operational infrastructure, such as solar charging system 600 for example. And as shown in FIG. 11B, once the dual-mode UAV 1100 arrives at the operational location 704*d* (e.g., a roof of a particular house), the dual-mode UAV 1100 may install the solar charging system 600 at the operational location 704*d*.

To do so, the dual-mode UAV 1100 may lower a tether of the dual-mode UAV 1100 that is coupled to the hook 608 of the solar charging system 600, so as to cause the solar charging system 600 to lower towards the ground (e.g., towards the roof) while the dual-mode UAV 1100 hovers above the ground. And once the solar charging system 600 contacts the ground (e.g., the roof), the dual-mode UAV 1100 may cause the tether to decouple from the hook 608 of the solar charging system 600, thereby completing installation of the solar charging system 600 at the operational location 704*d* (not shown). Other illustrations are also possible.

At block 1006, method 1000 may involve receiving, by the control system, a request for a transport task having an associated item-source location. At block 1008, method 1000 may involve determining, by the control system, that the item-source location corresponds to the first of the plurality of operational locations. And at block 1010, method 1000 may involve causing, by the control system, the first UAV to perform the transport task.

Once a dual-mode mode UAV completes an infrastructure deployment task at an operational location, the dual-mode UAV can then operate from that operational location, which may involve the dual-mode UAV carrying out transport task(s) from the operational location, among other options.

More specifically, in line with the discussion above, a control system can receive a request for a transport task, which may be a request to pick up and/or deliver one or more items. In practice, the request may specify a pickup location for pickup of an item and/or a delivery location for delivery of an item. For instance, the pickup location can be an address or can be specified in other ways, such using a name of a business. Similarly, the delivery location can be an address or can be specified in other ways. Moreover, the control system can receive such a request at any feasible time, such as before completion of any infrastructure deployment task(s) in a geographic area or after completion of one or more infrastructure deployment tasks in a geographic area, among other possibilities.

By way of example, an individual user can request UAV delivery of a package to their home via their mobile phone, tablet, or laptop. And in another example, a business user (e.g., a restaurant) can utilize one or more remote devices to request that a UAV be dispatched to pick up one or more items (e.g., a food order) from a pickup location (e.g., the restaurant's address), and then deliver the one or more items to a delivery location (e.g., a customer's address). Other examples are also possible.

When the control system receives a request for a transport task, the control system may assign a UAV to carry out this transport task. In particular, the control system can determine that the pickup location associated with the request corresponds to the operational location at which the dual-mode UAV at issue completed the infrastructure deployment task. For example, the control system can do so by determining that the pickup location is in a sub area that is associated with the operational location at issue in line with the discussion above. In any case, once the control system determines that the pickup location corresponds to the operational location at issue, the control system may cause the dual-mode UAV to perform the requested transport task, such by at least instructing the dual-mode UAV to pick up the item at the pickup location, and possibly also instructing the dual-mode UAV to deliver the item at a delivery location associated with the request.

Furthermore, when the dual-mode UAV operates from the operational location at which it completed the infrastructure deployment task, the dual-mode UAV can charge its battery at the operational location using the operational infrastructure that this same dual-mode UAV installed. Generally, the dual-mode UAV can do so at one or more of various times.

In one example, the dual-mode UAV can charge the battery at the operational location immediately after completing an infrastructure deployment task at this operational location. In another example, the dual-mode UAV can charge the battery at the operational location while carrying out a transport task from this operational location, such as between pickup and delivery of an item, for instance. In yet another example, the dual-mode UAV can charge the battery at the operational location after carrying out one or more transport tasks from this operational location. Other examples are also possible.

Figure 11C:
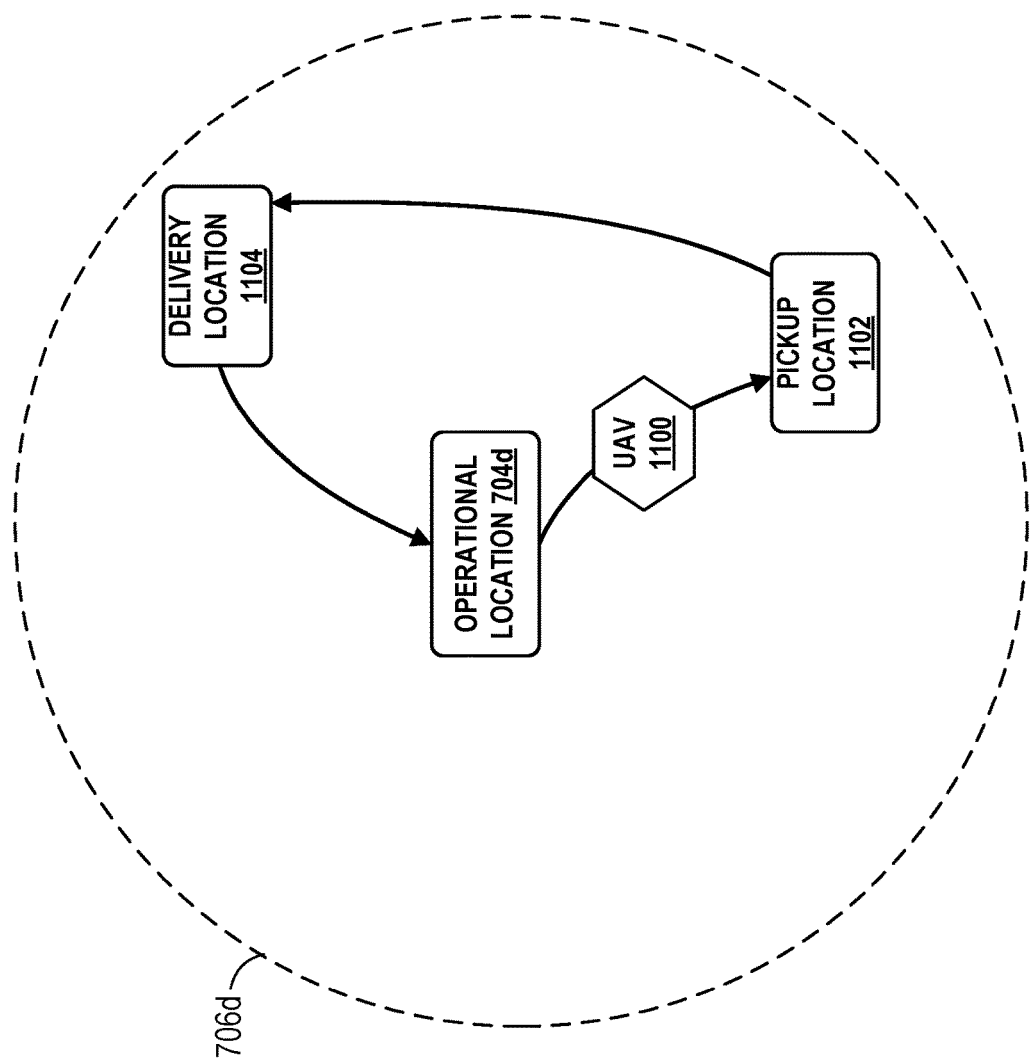
Figure 11D:
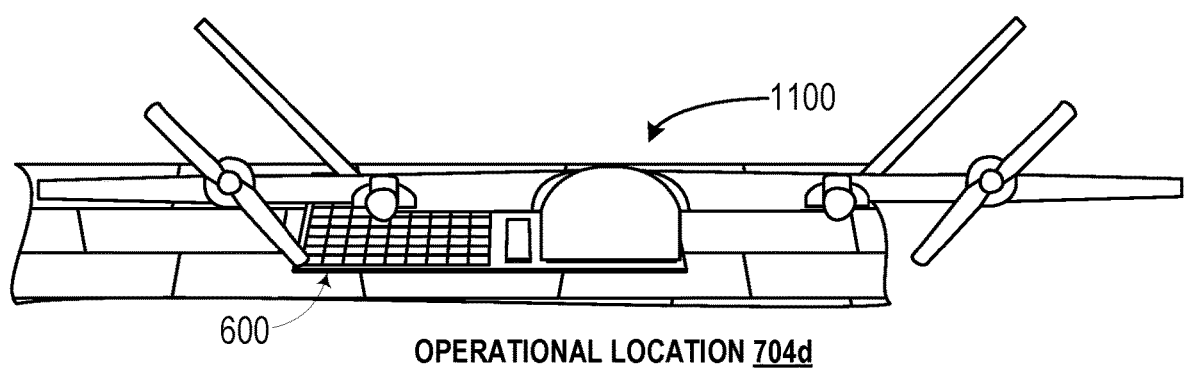

FIGS. 11C to 11D next illustrate the dual-mode UAV 1100 charging its battery at the operational location 704*d* after completion of a transport task.

In particular, as shown in FIG. 11C, the dual-mode UAV 1100 may carry out a transport task in the sub area 706*d*. This transport task may include (i) a flight from the operational location 704*d* to a pickup location 1102 for pickup of an item at the pickup location 1102, (ii) a flight from the pickup location 1102 to a delivery location 1104 for delivery of the item at the delivery location 1104, and (iii) a flight from the delivery location 1106 back to the operational location 704*d*.

Once the dual-mode UAV 1100 arrives back at the operational location 704*d*, the dual-mode UAV 1100 may charge a battery of the dual-mode UAV 1100 using operational infrastructure that has been deployed by dual-mode UAV 1100 itself at the operational location 704*d*. For example, as shown in FIG. 11D, the dual-mode UAV 1100 may land on the charge pad 606 of the solar charging system 600 that has been by the dual-mode UAV 1100 at the operational location 704*d*, and may then receive electrical power from the solar charging system 600, so as to charge the battery. Moreover, after the dual-mode UAV 1100 charges its battery at the operational location 704*d*, the UAV 902 can then carry out additional transport task(s) in the associated sub area 706*d*, among other options. Other illustrations are also possible.

In some situations, a dual-mode UAV can carry out an infrastructure deployment task for an operational location, and then a different UAV may operate from the operational location, such as by charging its battery at the operational location and/or carrying out transport task(s) from the operational location. For example, a first dual-mode UAV can carry out an infrastructure deployment task for an operational location and then another UAV, which may or may not be a dual-mode UAV, can operate from the second operational location. Other examples are also possible.

Given an implementation in which a group of UAVs includes one or more dual-mode UAVs, operational infrastructure can be added, removed, and/or moved by one or more dual-mode UAVs at any feasible time and for any feasible reasons. For example, operational infrastructure can be added, removed, and/or moved when an ATSP just begins providing aerial transport services in a geographic area by causing one or more dual-mode UAVs to each respectively fly from the source structure to an operational location in the geographic area, so as to install operational infrastructure at those operational location(s). In another example, operational infrastructure can be added, removed, and/or moved while an ATSP is providing aerial transport services in a geographic area, such as after completion of one or more transport tasks in the geographic area. In any case, such addition, removal, and/or movement of operational infrastructure can be based on demand for aerial service of the group and/or based on a determined need for operational infrastructure in a geographic area, among other options.

Furthermore, any given dual-mode UAV of the group can carry out addition, removal, and/or movement of operational infrastructure.

By way of example, a first dual-mode UAV can carry out a first infrastructure deployment task for a first operational location, and perhaps can then carry out at least a first transport task that has an associated first pickup location and that corresponds to a first request. In this example, a second infrastructure deployment task may additionally be carried out for a second operational location. In one case, the same first dual-mode UAV can carry out the second infrastructure deployment task. In another case, however, a second dual-mode UAV can carry out the second infrastructure deployment task. Other cases are also possible.

In any case, the second infrastructure deployment task may include a flight to the second operational location. In one situation, this flight may be from the first operational location to the second operational location. In another situation, however, this flight may be from a source location to the second operational location. Other cases are also possible.

Additionally, the second infrastructure deployment task may include installation of operational infrastructure at the second operational location.

In one case, this operational infrastructure may be operational infrastructure that the first dual-mode UAV initially installed at the first operational location. In this case, the first dual-mode UAV or the second dual-mode UAV may transport this operational infrastructure from the first operational location to the second operational location, so that this operational infrastructure can then be installed at the second operational location by whichever UAV transported the operational infrastructure.

In another case, this operational infrastructure may be operational infrastructure that the first dual-mode UAV or the second dual-mode UAV transports from a source location to the second operational location, so that this operational infrastructure can be installed at the second operational location by whichever UAV transported the operational infrastructure. Thus, this operational infrastructure may be different from the operational infrastructure that the first dual-mode UAV installed at the first operational location. Other cases are also possible.

Further, the second operational location at issue can be any feasible location that is different from the first operational location.

In one case, in line with the discussion above, the second operational location may be a second of the determined operational locations from which the group of UAVs is to provide aerial transport services in a geographic area. For instance, the first operational location may be one associated with a first sub area of the geographic area, and the second operational location may be one associated with a second sub area of the same geographic area.

In this case, the control system may cause the first dual-mode UAV or the second dual-mode UAV to perform the second infrastructure deployment task for the second operational location for various reasons. For instance, the control system may cause the first dual-mode UAV or the second dual-mode UAV to perform the second infrastructure deployment task based on a determined demand for aerial transport service of the group at the second sub area.

In a more specific example, the control system can determine that for demand for aerial transport service of the group at the first sub area is relatively low and that demand for aerial transport service of the group at the second sub area is relatively high. Thus, the control system may responsively cause the first dual-mode UAV or the second dual-mode UAV to perform an infrastructure deployment task that includes moving operational infrastructure from the first operational location to the second operational location. Other examples are also possible.

In another case, the second operational location may be in a different geographic area. For instance, the first operational location may be in a first geographic area, and the second operational location may be in a second geographic area. In practice, the first and second geographic areas can be different cities or different neighborhoods, among other options.

In this case, the control system may cause the first dual-mode UAV or the second dual-mode UAV to perform the second infrastructure deployment task for the second operational location for various reasons. For instance, the control system may cause the first dual-mode UAV or the second dual-mode UAV to perform the second infrastructure deployment task based on a determined demand for aerial transport service at the second geographic area, which may be serviced by a different group of UAVs than the group that includes the first and/or second dual-mode UAVs at issue.

In a more specific example, the control system can determine that demand for aerial transport service at the first geographic area is relatively low and that demand for aerial transport service at the second geographic area is relatively high. Thus, the control system may responsively cause the first dual-mode UAV or the second dual-mode UAV to perform an infrastructure deployment task that includes moving operational infrastructure from the first operational location to the second operational location, so that UAVs of the different group servicing the second geographic area can use this additional operational infrastructure. Other examples are also possible.

Yet further, once the second infrastructure deployment task for the second operational location is complete, one or more UAVs, which may or may not be dual-mode UAV(s), can operate from the second operational location. In line with the discussion above, operating from the second operational location can involve carrying out transport task(s) from the second operational location. For instance, a UAV can at least perform a second transport task that has an associated second pickup location and that corresponds to a second request. Additionally or alternatively, operating from the second operational location can involve a UAV using operational infrastructure installed at the second operational location to charge its battery.

In a more specific example, the first dual-mode UAV can carry out the second infrastructure deployment task for the second operational location and can then itself operate from the second operational location. In another example, the first dual-mode UAV can carry out the second infrastructure deployment task for the second operational location and then another UAV, such as the second dual-mode UAV for instance, can operate from the second operational location. In yet another example, the second dual-mode UAV can carry out the second infrastructure deployment task for the second operational location and can then itself operate from the second operational location. In yet another example, the second dual-mode UAV can carry out the second infrastructure deployment task for the second operational location and then another UAV, such as the first dual-mode UAV for instance, can operate from the second operational location. Other examples are also possible.

X. ADDITIONAL FEATURES

A. Record of Operational Infrastructure

In a further aspect, a control system can maintain and modify a record of operational infrastructure that has been deployed in a geographic area. In particular, the record may specify, respectively for each instance of deployed operational infrastructure, an operational location at which this operational infrastructure is currently deployed, operational location(s) at which this operational infrastructure has been previously deployed, a type of operational infrastructure (e.g., solar charging system vs. charging interface), and/or information about the UAV that deployed the operational infrastructure, among various other possibilities. And the control system can modify of this information as operational infrastructure is added, moved, and/or removed in the geographic area.

By way of example, the control system can receive a confirmation that first operational infrastructure has been deployed at a first operational location. The control system can receive this confirmation from the UAV that deployed the first operational infrastructure at the first operational location, among other options. Nonetheless, the control system may respond to receipt of the confirmation by modifying the record to indicate that the first operational infrastructure has been deployed at the first operational location. And in some cases, the control system can also modify the record to indicate the UAV that deployed the first operational infrastructure at the first operational location, among other possibilities.

In practice, maintaining and modifying a record of operational infrastructure may help the control system optimize charging of batteries of UAVs. For instance, when a trigger has been encountered to charge a battery of a UAV, the control system can use the record as basis for making a determination that a current location of the UAV is threshold proximate to the first operational infrastructure that has been deployed at the first operational location. For example, the control system can determine that the current location of the UAV is in a particular sub area of a geographic area, and can use the record to determine that the first operational infrastructure that has been deployed at the first operational location, which is associated with the particular sub area at issue. In any case, the control system can use the determination as basis for instructing the UAV to charge a battery of the UAV using the first operational infrastructure that has been deployed at the first operational location.

B. Return Conditions for a UAV

In yet a further aspect, a control system may determine that a given UAV, which can be any type of UAV, encountered a return condition indicating that the UAV should fly to a certain location.

For example, the control system may determine that the UAV completed a transport task. For instance, the control system may assign a transport task to the UAV and may then receive a confirmation from that UAV specifying that the transport task has been completed.

In another example, the control system may determine that the UAV is in condition for a maintenance event. For instance, the control system may have stored thereon maintenance data indicating that the UAV's tether, or other part, should be replaced once every year or other threshold period of time, and can determine that the UAV is in condition for a maintenance event by determining that the threshold period of time has passed or been exceeded since replacement of the UAV's tether or other part.

In yet another example, the control system may determine that the UAV is in condition for an upgrade. For instance, the control system may receive information from a central server indicating that a new propulsion unit has been developed for a UAV of a particular type, and can responsively determine that this UAV's existing propulsion unit should be upgraded to the newly developed propulsion unit.

In yet another example, the control system may determine that the UAV encountered a predefined weather condition. For instance, the control system may receive weather information from a central server indicating that a storm is approaching a sub area in which the UAV is operating. And the control system may determine that a storm corresponds to a predefined weather condition during which the UAV should not fly.

In yet another example, the control system may determine that the UAV encountered a re-charging condition. For instance, the control system may receive sensor data from the UAV indicating that a battery level of the UAV's battery is below a threshold level. Other examples are also possible.

When the control system determines that a UAV encountered a return condition, the control system may responsively cause the UAV to fly to a certain location. This location can be an operational location from which the UAV is operating, an operational location other than the one from which the UAV is operating, the source structure at the source location, and/or a hangar, among other options. In any case, the location may correspond to the specific return condition that the UAV encountered, so that the UAV can overcome the circumstances that led to the control system determining that the return condition has been encountered.

For example, if the control system determines that the UAV completed a transport task, the control system may responsively cause the UAV to fly back to the operational location from which it is operating, so that the UAV can then carry out additional transport tasks in the associated sub area on an as-needed basis.

In another example, if the control system determines that the UAV is in condition for a maintenance event and/or is in condition for an upgrade, the control system may responsively cause the UAV to fly to the hangar, so that a technician can perform the maintenance and/or the upgrade accordingly.

In yet another example, if the control system determines that the UAV encountered a predefined weather condition, the control system may responsively cause the UAV to fly to the hangar or to the source structure, so that the UAV avoids exposure to the weather condition at issue.

In yet another example, if the control system determines that the UAV encountered a re-charging condition, the control system may responsively cause the UAV to fly to the operation location from which it is operating, so that the UAV can use operational infrastructure deployed at this operational location for charging the UAV's battery. Other examples are also possible.

XI. CONCLUSION

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A method comprising:
    determining, by a control system, a plurality of operational locations from which a group of unmanned aerial vehicles (UAVs) is to provide aerial transport services in a geographic area;
    for at least a first operational location of the plurality of operational locations, causing, by the control system, a first UAV from the group to perform an infrastructure deployment task that includes (i) a flight to the first operational location and (ii) installation of operational infrastructure at the first operational location by the first UAV;
    receiving, by the control system, a request for a transport task having an associated item-source location;
    determining, by the control system, that the item-source location corresponds to a second operational location of the plurality of operational locations; and
    causing, by the control system, the first UAV to perform the transport task.

2. The method of claim 1, further comprising:
    determining, by the control system, a demand for aerial transport services in a first sub area of the geographic area,
    wherein causing the first UAV to perform the infrastructure deployment task is based on the demand for aerial transport services in the first sub area.

3. The method of claim 1, further comprising:
    for at least the second operational location, causing, by the control system, a second UAV from the group to perform another infrastructure deployment task that includes (i) a flight to the second operational location and (ii) installation of another operational infrastructure at the second operational location by the second UAV;
    receiving, by the control system, another request for another transport task having an associated another item-source location;
    determining, by the control system, that the another item-source location corresponds to the second operational location; and
    causing the second UAV to perform the another transport task.

4. The method of claim 3, further comprising:
    determining, by the control system, a demand for aerial transport services in a second sub area of the geographic area,
    wherein causing the second UAV to perform the another infrastructure deployment task is based on the demand for aerial transport services in the second sub area of the geographic area.

5. The method of claim 1, wherein the first operational location is one from which one or more UAVs of the group are to provide aerial transport services in a first sub area of the geographic area, and wherein the second operational location is one from which one or more UAVs of the group are to provide aerial transport services in a second sub area of the geographic area.

6. The method of claim 5, wherein the first sub area comprises a first plurality of locations that are each respectively within a first threshold distance away from the first operational location, and wherein the second sub area comprises a second plurality of locations that are each respectively within a second threshold distance away from the second operational location.

7. The method of claim 1, further comprising:
    receiving, by the control system, another request for another transport task having an associated another item-source location;
    determining, by the control system, that the another item-source location corresponds to the first operational location; and
    causing the first UAV to perform the another transport task.

8. The method of claim 1, wherein the operational infrastructure comprises a charging system that comprises one or more of: (i) a charging interface configured to connect to a universal power interface, (ii) a solar panel, or (iii) an energy storage device.

9. The method of claim 1, wherein the operational infrastructure is a charging system, and wherein the method further comprises:
    causing, by the control system, the first UAV to use at least one of: (i) the charging system installed by the first UAV at the first operational location to charge a battery of the first UAV, or (ii) another charging system installed by a second UAV at the second operational location to charge a battery of the first UAV.

10. The method of claim 1, wherein the operational infrastructure is a charging system, and wherein the method further comprises:
    causing, by the control system, a second UAV of the group to use the charging system installed by the first UAV at the first operational location to charge a battery of the second UAV.

11. The method of claim 1, wherein the transport task comprises pickup of an item at the item-source location and subsequent delivery of the item at a delivery location.

12. The method of claim 1, further comprising:
    causing, by the control system, the first UAV to perform another infrastructure deployment task that includes (i) a flight to a third operational location and (ii) installation of operational infrastructure at the third operational location by the first UAV;
    receiving, by the control system, another request for another transport task having an associated another item-source location;
    determining, by the control system, that the another item-source location corresponds to the third operational location; and
    causing the first UAV to perform the another transport task.

13. The method of claim 12, wherein the another infrastructure deployment task further includes moving the operational infrastructure installed at the first operational location by the first UAV from the first operational location to the third operational location.

14. The method of claim 1, further comprising:
   determining, by the control system, a plurality of authorized locations at which respective deployment of operational infrastructure is permitted,
   wherein determining the plurality of operational locations is based on each determined operational location respectively being one of the plurality of authorized locations.

15. The method of claim 1, further comprising:
   determining, by the control system, a demand for aerial transport services of the group in the geographic area,
   wherein determining the plurality of operational locations is based on the demand for aerial transport services of the group in the geographic area.

16. The method of claim 1, further comprising:
   determining, by the control system, a flight range respectively of one or more UAVs of the group,
   wherein determining the plurality of operational locations is based the one or more flight ranges.

17. The method of claim 1, wherein determining the plurality of operational locations comprises:
   determining the plurality of operational locations using a machine learning process trained to determine the plurality of operational locations based on resource usage by one or more UAVs when operating from one or more prior operational locations.

18. An unmanned aerial vehicle (UAV) system comprising:
   a group of UAVs, wherein the group of UAVs includes at least a first UAV; and
   a control system configured to perform operations comprising:
      determining a plurality of operational locations from which the group of UAVs is to provide aerial transport services in a geographic area;
      for at least a first operational location of the plurality of operational locations, causing the first UAV to perform an infrastructure deployment task that includes (i) a flight to the first operational location and (ii) installation of operational infrastructure at the first operational location by the first UAV;
      receiving a request for a transport task having an associated item-source location;
      determining that the item-source location corresponds to a second operational location of the plurality of operational locations; and
      causing the first UAV to perform the transport task.

19. The UAV system of claim 18, wherein the operations further comprise:
   for at least the second operational location, causing a second UAV from the group to perform another infrastructure deployment task that includes (i) a flight to the second operational location and (ii) installation of another operational infrastructure at the second operational location by the second UAV;
   receiving another request for another transport task having an associated another item-source location;
   determining that the another item-source location corresponds to the second operational location; and
   causing the second UAV to perform the another transport task.

20. A non-transitory computer readable medium having stored thereon instructions that, when executed by a computing device, cause the computing device to perform operations comprising:
   determining, a plurality of operational locations from which a group of unmanned aerial vehicles (UAVs) is to provide aerial transport services in a geographic area;
   for at least a first operational location of the plurality of operational locations, causing a first UAV from the group to perform an infrastructure deployment task that includes (i) a flight to the first operational location and (ii) installation of operational infrastructure at the first operational location by the first UAV;
   receiving a request for a transport task having an associated item-source location;
   determining that the item-source location corresponds to a second operational location of the plurality of operational locations; and
   causing the first UAV to perform the transport task.

* * * * *